US011127011B2

United States Patent
Jin et al.

(10) Patent No.: US 11,127,011 B2
(45) Date of Patent: Sep. 21, 2021

(54) ELECTRONIC DEVICE AND PAYMENT PERFORMANCE METHOD USING HANDOFF THEREOF

(71) Applicant: Samsung Electronics Co., Ltd., Suwon-si (KR)

(72) Inventors: In Ji Jin, Bucheon-si (KR); Hyuk Kang, Yongin-si (KR); Tae Gun Park, Hwaseong-si (KR); Kyung Soo Lim, Yongin-si (KR); Gi Beom Kim, Seongnam-si (KR); Seung Hwan Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 591 days.

(21) Appl. No.: 15/392,802

(22) Filed: Dec. 28, 2016

(65) Prior Publication Data

US 2017/0186015 A1 Jun. 29, 2017

(30) Foreign Application Priority Data

Dec. 28, 2015 (KR) .................. 10-2015-0187296

(51) Int. Cl.
*G06Q 20/40* (2012.01)
*G06Q 20/32* (2012.01)
(Continued)

(52) U.S. Cl.
CPC ....... *G06Q 20/40145* (2013.01); *G06Q 20/10* (2013.01); *G06Q 20/12* (2013.01);
(Continued)

(58) Field of Classification Search
CPC .................................. G06Q 20/322
(Continued)

(56) References Cited

U.S. PATENT DOCUMENTS 8,401,681 B2 3/2013 Rosenblatt et al.
8,458,363 B2 6/2013 Rosenblatt et al.
(Continued)

FOREIGN PATENT DOCUMENTS

CN 1849632 A 10/2006
CN 102984556 A 3/2013
(Continued)

OTHER PUBLICATIONS

"Graphical user interface (GUI)". Encyclopædia Britannica. Encyclopædia Britannica Online. Encyclopædia Britannica Inc., 2015. Web. Dec. 1, 2015 <https://web.archive. org/web/20151202050836/https://www.britannica.com/technology/graphical-user-interface> (Year: 2015).*

(Continued)

*Primary Examiner* — Cho Kwong
(74) *Attorney, Agent, or Firm* — Jefferson IP Law, LLP

(57) ABSTRACT

An electronic device and method thereof are provided. The electronic device includes a communication circuit configured to communicate with an external device, a memory configured to store at least one card information, and a processor configured to electrically connect with the communication circuit and the memory. The processor is configured to receive a first request to verify whether it is possible to pay from the external device, send a response to the first request to the external device, and receive a second request, including transaction information associated with a payment, from the external device.

14 Claims, 15 Drawing Sheets

(51) Int. Cl.
  *G06Q 20/12* (2012.01)
  *G06Q 20/10* (2012.01)
  *G06Q 20/34* (2012.01)

(52) U.S. Cl.
  CPC ......... *G06Q 20/32* (2013.01); *G06Q 20/3227* (2013.01); *G06Q 20/34* (2013.01); *G06Q 20/40* (2013.01); *G06Q 20/401* (2013.01)

(58) Field of Classification Search
  USPC .......................................................... 705/44
  See application file for complete search history.

(56) References Cited

U.S. PATENT DOCUMENTS

| | | | |
|---|---|---|---|
| 8,516,125 | B2 | 8/2013 | Rosenblatt et al. |
| 8,977,269 | B2 | 3/2015 | Chhabra |
| 9,003,299 | B2 | 4/2015 | Freedman |
| 9,003,595 | B2 | 4/2015 | Jones |
| 9,015,482 | B2 | 4/2015 | Baghdasaryan et al. |
| 9,026,459 | B2 * | 5/2015 | Fisher ................ H04W 4/21 705/16 |
| 9,077,759 | B2 | 7/2015 | Brouwer et al. |
| 9,083,689 | B2 | 7/2015 | Lindemann et al. |
| 9,124,637 | B2 | 9/2015 | Brouwer et al. |
| 9,130,802 | B2 | 9/2015 | Rosenblatt et al. |
| 9,172,687 | B2 | 10/2015 | Baghdasaryan et al. |
| 9,219,732 | B2 | 12/2015 | Baghdasaryan et al. |
| 9,267,805 | B2 | 2/2016 | Marti et al. |
| 9,285,231 | B2 | 3/2016 | Jouaux et al. |
| 9,306,754 | B2 | 4/2016 | Baghdasaryan et al. |
| 9,424,568 | B2 | 8/2016 | Khan et al. |
| 9,479,583 | B2 | 10/2016 | Brouwer et al. |
| 9,533,656 | B2 | 1/2017 | Jones |
| 10,077,023 | B2 | 9/2018 | Jones |
| 10,081,336 | B2 | 9/2018 | Jones |
| 2003/0030751 | A1 * | 2/2003 | Lupulescu ......... H04N 5/44543 348/552 |
| 2003/0056111 | A1 | 3/2003 | Brizek |
| 2006/0224470 | A1 | 10/2006 | Garcia Ruano et al. |
| 2008/0046366 | A1 * | 2/2008 | Bemmel ................ G06Q 20/20 705/44 |
| 2009/0276439 | A1 | 11/2009 | Rosenblatt et al. |
| 2009/0276547 | A1 | 11/2009 | Rosenblatt et al. |
| 2010/0082136 | A1 | 4/2010 | Rosenblatt et al. |
| 2011/0202427 | A1 | 8/2011 | Garcia et al. |
| 2012/0240138 | A1 * | 9/2012 | Low ................ G06Q 20/02 725/5 |
| 2013/0294306 | A1 | 11/2013 | Borges et al. |
| 2013/0311602 | A1 | 11/2013 | Rosenblatt et al. |
| 2013/0332846 | A1 | 12/2013 | Freedman |
| 2014/0000929 | A1 | 1/2014 | Masakowski et al. |
| 2014/0018828 | A1 | 1/2014 | Foerster et al. |
| 2014/0128063 | A1 | 5/2014 | Chhabra et al. |
| 2014/0180923 | A1 | 6/2014 | Choi |
| 2014/0189350 | A1 | 7/2014 | Baghdasaryan et al. |
| 2014/0189360 | A1 | 7/2014 | Baghdasaryan et al. |
| 2014/0189779 | A1 | 7/2014 | Baghdasaryan et al. |
| 2014/0189791 | A1 | 7/2014 | Lindemann et al. |
| 2014/0189828 | A1 | 7/2014 | Baghdasaryan et al. |
| 2014/0208404 | A1 | 7/2014 | Brouwer et al. |
| 2014/0208434 | A1 | 7/2014 | Brouwer et al. |
| 2014/0244488 | A1 * | 8/2014 | Kim ...................... G06Q 20/02 705/39 |
| 2014/0362728 | A1 | 12/2014 | Krochmal et al. |
| 2014/0364149 | A1 | 12/2014 | Marti et al. |
| 2014/0364150 | A1 | 12/2014 | Marti et al. |
| 2014/0365913 | A1 | 12/2014 | Santamaria et al. |
| 2015/0066765 | A1 | 3/2015 | Banks et al. |
| 2015/0073703 | A1 | 3/2015 | Jouaux et al. |
| 2015/0095219 | A1 | 4/2015 | Hurley |
| 2015/0095238 | A1 | 4/2015 | Khan et al. |
| 2015/0181637 | A1 | 6/2015 | Chhabra |
| 2015/0183402 | A1 | 7/2015 | Jones |
| 2015/0186887 | A1 | 7/2015 | Khan et al. |
| 2015/0205851 | A1 | 7/2015 | Freedman |
| 2015/0222517 | A1 | 8/2015 | McLaughlin et al. |
| 2015/0348000 | A1 | 12/2015 | Khan et al. |
| 2016/0044101 | A1 | 2/2016 | Brouwer et al. |
| 2016/0174048 | A1 | 6/2016 | Marti et al. |
| 2016/0308674 | A1 | 10/2016 | Brouwer et al. |
| 2016/0358157 | A1 | 12/2016 | Khan et al. |

FOREIGN PATENT DOCUMENTS

| | | |
|---|---|---|
| CN | 104603808 A | 5/2015 |
| KR | 10-2004-0052338 A | 6/2004 |
| KR | 10-2004-0084154 A | 10/2004 |
| KR | 20140081650 A | 7/2014 |
| KR | 20140106012 A | 9/2014 |
| KR | 10-2015-0019496 A | 2/2015 |
| KR | 10-2015-0021388 A | 3/2015 |
| KR | 20150021833 A | 3/2015 |
| WO | 2015-183402 A1 | 12/2015 |

OTHER PUBLICATIONS

European Decision to Refuse dated Sep. 18, 2020 issued in European Patent Application No. 16207146.8-1222.

Chinese Office Action dated Apr. 21, 2021, issued in Chinese Patent Application No. CN 201611242712.X.

* cited by examiner

ELECTRONIC DEVICE AND PAYMENT PERFORMANCE METHOD USING HANDOFF THEREOF

CROSS-REFERENCE TO RELATED APPLICATION(S)

This application claims the benefit under 35 U.S.C. § 119(a) of a Korean patent application filed on Dec. 28, 2015, in the Korean Intellectual Property Office and assigned Serial number 10-2015-0187296, the entire disclosure of which is hereby incorporated by reference.

TECHNICAL FIELD

The present disclosure relates to technologies for providing card payment services using electronic devices.

BACKGROUND

With the development of electronic technologies, various types of electronic devices have been developed and distributed. Particularly, recently, there has been a growing interest in electronic devices, such as tablet personal computers (PCs) and wearable devices, as well as smartphones. It becomes more frequent that one user uses various electronic devices simultaneously.

To perform payment via an electronic device, payment information associated with a payment means or method to perform payment may be requested. For example, the payment means may include various payment means, for example, an Internet bank, FinTech, electronic banking, an electronic cash (e.g., bitcoin, Alipay, and cyber money), a bank account, a credit card, a debit card, a membership card, and a reserve card. The above-mentioned payment means are not limited to contents described as various embodiments in the specification.

If one user uses a plurality of electronic devices such as smartphones, tablet PCs, smart watches, laptops, and desktops, information associated with payment (e.g., card information, bank information, or the like) may be stored in each of the electronic devices to perform the payment using each of the electronic devices. In this case, since there are various hacking paths of the information associated with the payment, there is a high probability that a security problem can occur. Also, to store payment information in each of the electronic devices, the user should perform an inconvenient authentication procedure several times.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device for processing payment requested by various electronic devices using information stored in one electronic device and a method therefor.

In accordance with an aspect of the present disclosure, an electronic device is provided. The electronic device includes a communication circuit configured to communicate with an external device, a memory configured to store at least one card information, and a processor configured to electrically connect with the communication circuit and the memory. The processor is further configured to receive a first request, to verify whether a payment is possible, from the external device, send a response to the first request to the external device, and receive a second request, including transaction information associated with the payment, from the external device.

In accordance with another aspect of the present disclosure, a non-transitory computer-readable recording medium storing instructions executed by at least one processor is provided. The instructions, when executed by the at least one processor, are configured to cause a computer to receive a first request, to verify whether a payment is possible, from an external device, send a response to the first request to the external device, and receive a second request, including transaction information associated with the payment, from the external device.

In accordance with another aspect of the present disclosure, a non-transitory computer-recording storage medium storing instructions executed by at least one processor is provided. The instructions, when executed by the at least one processor, are configured to send a first request, to verify whether a payment is possible for selected electronic commerce, to an electronic device which communicates with the computer, receive a response to the first request from the electronic device, and send a second request, including transaction information associated with the payment, to the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
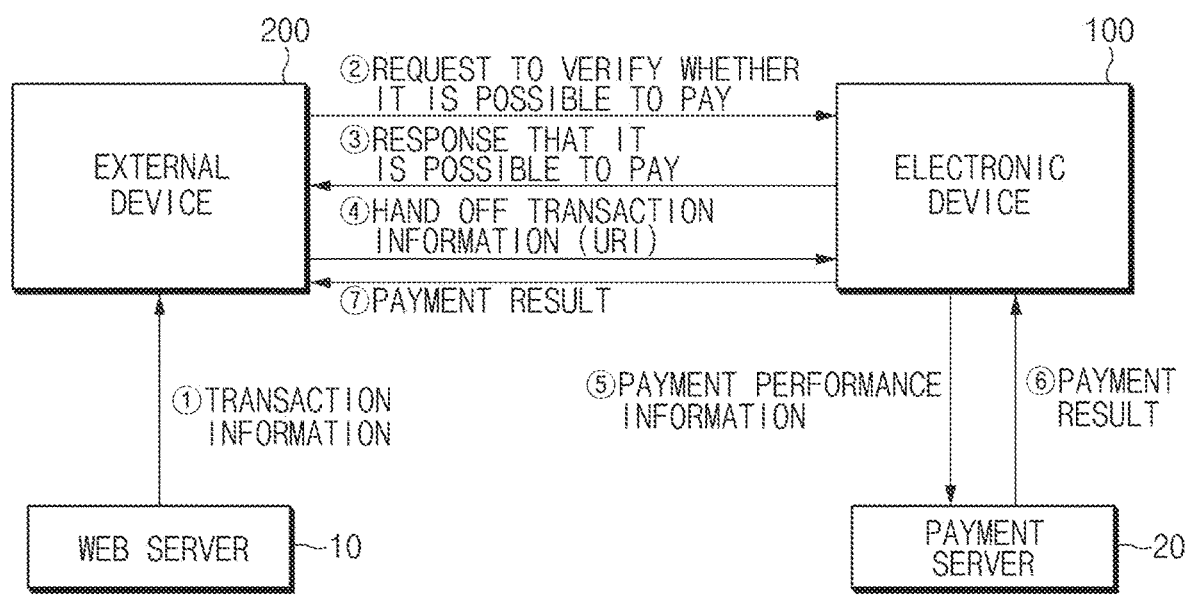
FIG. 1 is a block diagram illustrating an environment where an electronic device operates according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have," "may have," "include," "comprise," "may include," and "may comprise" as used herein indicate existence of corresponding features (e.g., elements such as numeric values, functions, operations, or components) but do not exclude presence of additional features.

In the disclosure disclosed herein, the expressions "A or B," "at least one of A or/and B," or "one or more of A or/and B," and the like used herein may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The expressions such as "1st," "2nd," "first," or "second," and the like used in various embodiments of the present disclosure may refer to various elements irrespective of the order and/or priority of the corresponding elements, but do not limit the corresponding elements. The expressions may be used to distinguish one element from another element. For instance, both "a first user device" and "a second user device" indicate different user devices from each other irrespective of the order and/or priority of the corresponding elements. For example, a first component may be referred to as a second component and vice versa without departing from the scope of the present disclosure.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

Depending on the situation, the expression "configured to" used herein may be used as, for example, the expression "suitable for," "having the capacity to," "designed to," "adapted to," "made to," or "capable of." The term "configured to" must not mean only "specifically designed to" as hardware. Instead, the expression "a device configured to" may mean that the device is "capable of" operating together with another device or other components. For example, a "processor configured to perform A, B, and C" may mean a generic-purpose processor (e.g., a central processing unit (CPU) or an application processor (AP)) which may perform corresponding operations by executing one or more software programs or which stores a dedicated processor (e.g., an embedded processor) for performing a corresponding operation.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude various embodiments of the present disclosure.

Electronic devices according to various embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group phase 1 or phase 2 (MPEG-1 or MPEG-2) audio layer 3 (MP3) players, mobile medical devices, cameras, or wearable devices. According to various embodiments, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

In various embodiments, the electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

In various embodiments, the electronic devices may include at least one of various medical devices (e.g., various portable medical measurement devices (e.g., blood glucose meters, heart rate meters, blood pressure meters, or thermometers, and the like), a magnetic resonance angiography (MRA), a magnetic resonance imaging (MRI), a computed tomography (CT), scanners, or ultrasonic devices, and the like), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments, the electronic devices may include at least one of parts of furniture or buildings/structures, electronic boards, electronic signature receiving devices, projectors, or various measuring instruments (e.g., water meters, electricity meters, gas meters, or wave meters, and the like). The electronic devices according to various embodiments of the present disclosure may be one or more combinations of the above-mentioned devices. The electronic devices according to various embodiments of the present disclosure may be flexible electronic devices. Also, electronic devices according to various embodiments of the present disclosure are not limited to the above-mentioned devices, and may include new electronic devices according to technology development Hereinafter, electronic devices according to various embodiments will be described with reference to the accompanying drawings. The term "user" used herein may refer to a person who uses an electronic device or may refer to a device (e.g., an artificial electronic device) that uses an electronic device.

FIG. 1 is a block diagram illustrating an environment where an electronic device operates according to an embodiment of the present disclosure.

Referring to FIG. 1, an electronic device 100 may connect with an external device 200 and a payment server 20. The external device 200 may connect with a web server 10.

The external device 200 may receive transaction information about an electronic commerce from the web server 10 (see reference numeral ①). In more detail, the external device 200 may receive transaction information about an electronic commerce selected by its user from the web server 10 which provides the electronic commerce. For example, the external device 200 may access a web site for Internet shopping and may receive information about a product selected by the user from an Internet shopping mall server. The transaction information may include, for example, at least one of a uniform resource identifier (URI), a deep link, identification information of a seller, or an order number associated with payment. The deep link may be a link used in deep linking. The deep linking may refer to a technology of showing content associated with a link in a native application if the user clicks on the link displayed on a web.

The external device 200 may transmit a request to verify whether it is possible to pay for the selected electronic commerce (see reference numeral ②). The external device 200 may fail to include hardware for payment (e.g., a secure module, a fingerprint sensor, or the like) or software for payment (e.g., a payment application, card information, or the like). The external device 200 may broadcast a request to verify whether it is possible to pay to another device around the external device 200 to perform payment via another device including hardware and/or software for payment. The external device 200 may transmit a request using a communication mode, for example, Bluetooth low energy (BLE), Wi-Fi direct, or near field communication (NFC). The external device 200 may send the above-mentioned request to, for example, the external device 100.

According to an embodiment, the external device 200 may send a request to verify whether it is possible to pay to another electronic device to perform payment based on a situation of the external device 200. For example, if power of the external device 200 is insufficient, the external device 200 may hand off a payment related process to a device, which may pay, for secure payment. According to an embodiment, if security of a level which is higher than a security level supported by the external device 200 is requested for payment, the external device 200 may hand off a payment related process to the device which may pay. According to an embodiment, the external device 200 may request the electronic device 100 to pay by selection of the user or a previous setting value about a payment means. For example, when the user purchases a product via the external device 200, if he or she sets to pay only via the electronic device 100, the external device 200 may hand off a payment related process to the electronic device 100. According to an embodiment, the external device 200 may hand off payment to the electronic device 100 by its location, its situation, selection of the user, or a request from another device.

The electronic device 100 may receive a request to verify whether it is possible to pay for the selected electronic commerce from the external device 200. The electronic device 100 may receive a request using, for example, a communication mode (e.g., wireless communication) such as BLE, Wi-Fi direct, radio frequency identification (RFID), Z-wave, ZigBee, NFC, or the like.

The electronic device 100 may determine whether it is possible to pay for the selected electronic commerce in response to the received request. For example, the electronic device 100 may verify whether hardware and/or software for payment is included in the electronic device 100. For example, the electronic device 100 may verify capability of hardware or software (e.g., a payment related application) which may perform payment in the electronic device 100 in response to the received request. According to an embodiment, the electronic device 100 may verify capability of hardware or software associated with biometric authentication in the electronic device 100 in response to the received request. According to an embodiment, the electronic device 100 may verify a security level which may be provided by the electronic device 100, in response to the received request. For example, if a higher security level is requested from the external device 200, the electronic device 100 may verify a security level which may be provided by the electronic device 100 in response to capability of hardware or software and may send a response to the security level to the external device 200.

If it is possible to pay for the selected electronic commerce, the electronic device 100 may send a response to the received request to the external device 200 (see reference numeral ③). The electronic device 100 may send the response to the external device 200 using a communication mode used upon receiving the request. According to an embodiment, the electronic device 100 may send the response to the external device 200 using a communication mode different from the communication mode used upon receiving the request.

The external device 200 may hand off transaction information associated with payment. According to an embodiment, the external device 200 may output a user interface (UI) for a handoff of transaction information in response to the response received from the electronic device 100. For example, the external device 200 may output a pop-up for receiving a command to accept a handoff from the user on its display. The external device 200 may receive a user input on the UI. The external device 200 may hand off transaction information associated with payment to the electronic device 100 in response to the user input (see reference number ④). For example, the external device 200 may send transaction information, including at least one of a URI, a deep link, identification information of a seller, price information, a payment amount, a payment bank, product information, a service type, financial information, information about a device corresponding to the external device 200, or an order number associated with payment, to the electronic device 100.

The electronic device 100 may perform payment using the transaction information received from the external device 200. The electronic device 100 may perform payment using hardware and software for payment. The electronic device 100 may generate payment information and may send a payment request together with the payment information to the payment server 20 (see reference number ⑤). If the payment is completed, the electronic device 100 may receive the payment result from the payment server 20 (see reference numeral ⑥). The electronic device 100 may send the payment result to the external device 200 (see reference numeral ⑦).

The external device 200 may receive the result of the payment performed using the transaction information in the electronic device 100 from the electronic device 100. The external device 200 may output the payment result in response to receiving the payment result. The external device 200 may output, for example, a payment completion screen on the display.

Figure 2:
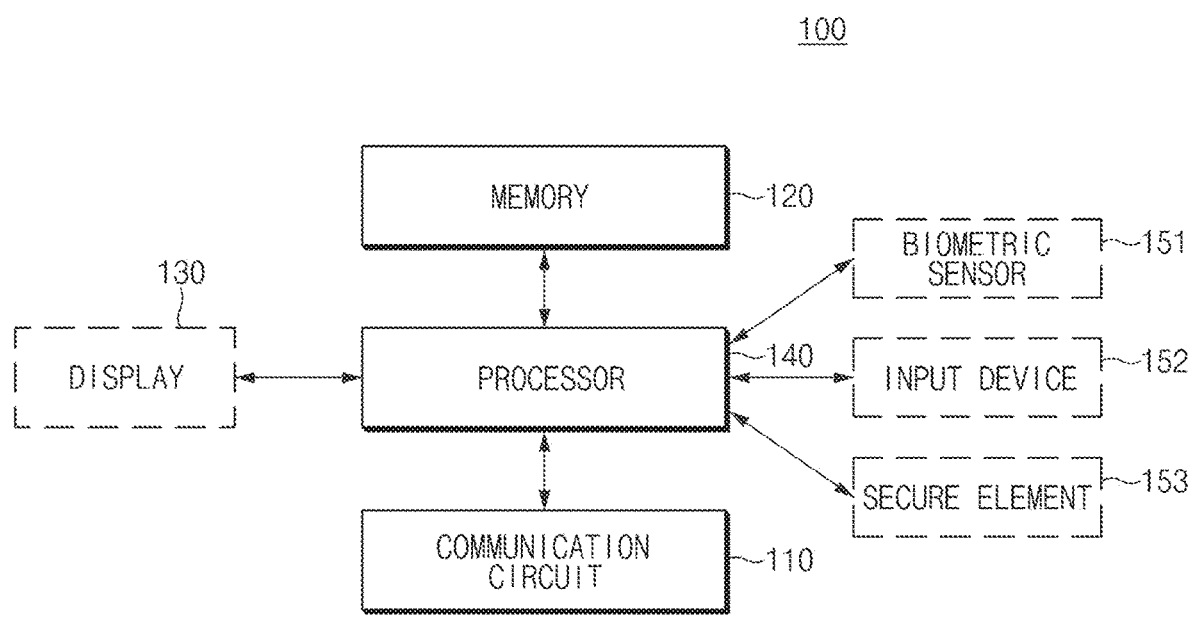
FIG. 2 is a block diagram illustrating a configuration of an electronic device according to an embodiment of the present disclosure.

FIG. 2 is a block diagram illustrating a configuration of an electronic device according to an embodiment of the present disclosure.

Referring to FIG. 2, an electronic device 100 may include a communication circuit 110, a memory 120, a display 130, and a processor 140.

The electronic device 100 may be a computing device which may support electronic payment. The electronic device 100 may a portable device, for example, a smartphone, a table PC, or a wearable device, which may be carried by its user. The electronic device 100 may perform payment requested by an external device 200 of FIG. 1 using hardware included in the electronic device 100 and payment related information (e.g., card information, bank information, financial information, balance information, card information, or the like) stored in the electronic device 100. For example, a user of the electronic device 100 may select a product using the external device 200 such as a desktop, a laptop, a tablet PC, or a TV and may immediately pay for a product selected by the external device 200 using the electronic device 100 such as a smartphone or a wearable device.

The communication circuit 110 may communicate with the external device 200. According to an embodiment, the communication circuit 110 may receive a request (a first request) associated with payment from the external device 200. For example, the communication circuit 110 may receive a request to verify whether it is possible to pay from the external device 200. The communication circuit 110 may send a response to the request to the external device 200. The communication circuit 110 may receive transaction information (or a second request including the transaction information) from the external device 200. The communication circuit 110 may include a communication circuit (e.g., a Wi-Fi module 1422, a Bluetooth (BT) module 1423, or a NFC module 1425 of FIG. 14) which supports a short-range communication mode, for example, BLE, Wi-Fi direct, or NFC. The communication circuit 110 may communicate with various external servers such as a web server 10 of FIG. 1, a payment server 20 of FIG. 1, and a cloud server. In this case, the communication circuit 110 may include a circuit which may communicate with an external server over a wireless communication network.

The memory 120 may include a volatile and/or non-volatile memory. According to an embodiment, the memory 120 may include at least one payment related information (e.g., bank information, financial information, balance information, card information, or the like). The memory 120 may store a payment application for performing payment using payment related information. The memory 120 may include, for example, a secure memory (e.g., a secure (or security) module 1436 of FIG. 14).

The display 130 may display a UI for performing payment. According to an embodiment, the display 130 may display a UI for receiving a command to accept payment from the user. According to an embodiment, the display 130 may display a web page or an application for performing payment based on a URI, a uniform resource locator (URL), server information or content information.

The processor 140 may operatively connect with the communication circuit 110, the memory 120, and the display 130. The processor 140 may control the communication circuit 110, the memory 120, and the display 130.

According to an embodiment, the processor 140 may receive a request (first request) associated with payment from the external device 200. The processor 140 may receive, for example, a request associated with payment to verify whether it is possible to pay from the external device 200. If a request is transmitted from the external device 200, the processor 140 may receive the request using the communication circuit 110. The processor 140 may receive a request through short-range communication, for example, BLE, Wi-Fi direct, or NFC. The request may include, for example, at least one of an identifier (ID) for a manufacturer of the external device 200, an ID for a payment service provider, a frame number, or a remaining time for a response.

According to an embodiment, the processor 140 may verify whether the electronic device 100 may perform payment, in response to the request. The processor 140 may verify whether it is possible for the electronic device 100 to perform payment.

According to an embodiment, the electronic device 100 may verify whether it is possible to pay based on capability of software of the electronic device 100. For example, the processor 140 may verify whether the memory 120 stores payment related information (e.g., card information, bank information, financial information, balance information, card information, or the like). The processor 140 may verify whether it is possible to pay based on payment related information stored in the electronic device 100. The payment related information may be stored in a secure element included in the electronic device 100. The processor 140 may verify whether payment related information stored in the electronic device 100 is available for payment. For another example, the processor 140 may verify whether the memory 120 stores a payment application.

According to an embodiment, the electronic device 100 may verify whether it is possible to pay based on capability of hardware of the electronic device 100. For example, the electronic device 100 may verify whether it is possible to pay using at least one of a biometric sensor 151 (e.g., a fingerprint sensor, an iris sensor, a face recognition sensor, or the like), a secure element 153 (e.g., a secure memory), or an input device 152 included in the electronic device 100. The processor 140 may verify whether the biometric sensor 151, the secure element 153, or the input device 152 is included in the electronic device 100.

According to an embodiment, the processor 140 may send an indication corresponding to the verification to the external device 200. The processor 140 may send a response to a request associated with payment, received from the external device 200, to the external device 200. If it is possible for the electronic device 100 to pay based on the verified result, the processor 140 may send the response to the request associated with the payment to the external device 200. For example, if payment related information is stored in the electronic device 100 and if fingerprint sensor is included in the electronic device 100, the processor 140 may send the response that it is possible for the electronic device 100 to pay to the external device 200. The response that it is possible to pay may include, for example, information about hardware included in the electronic device 100 and information about software stored in the electronic device 100 (e.g., application information or payment related information).

According to an embodiment, the processor 140 may receive transaction information (or a second request including the transaction information) associated with payment from the external device 200, based on the verification that it is possible for the electronic device 100 to pay. The processor 140 may receive transaction information associated with payment from the external device 200. The processor 140 may receive transaction information transmitted in response to a response to a request associated with payment from the external device 200. The processor 140 may receive, for example, transaction information, including at least one of a URL associated with payment, a deep link, identification information of a seller, or an order number, from the external device 200. For another example, the processor 140 may receive transaction information, including at least one of transaction data corresponding to payment, product information associated with a product corresponding to the payment, an image of the product corresponding to the payment, or an address (e.g., a URL) of a shopping mall corresponding to the payment, from the external device 200. For another example, the processor 140 may receive transaction information, including at least one of address information associated with payment, shopping cart information, a wish list, product information, content information, identification information of a seller, or an order number, from the external device 200.

According to an embodiment, the electronic device 100 may perform payment based on transaction information. For example, the processor 140 may perform payment using information about at least one card and transaction information in response to the second request. For example, the processor 140 may display a screen for performing payment on the display 130 based on received transaction information such as address information (e.g., a URI) associated with payment, shopping cart information, a wish list, product information, content information, identification information of a seller, or an order number. If the second request is received, the processor 140 may receive authentication information, such as a personal identification number (PIN) or a fingerprint, from a user of the electronic device 100. The processor 140 may receive authentication information from the user using the input device 152. The processor 140 may obtain biometric information as authentication information from the user of the electronic device 100 and may perform payment using the biometric information. The processor 140 may obtain biometric information from the user using the biometric sensor 151. The processor 140 may perform payment by communicating with a web server 10 or a payment server 20 of FIG. 1 using the transaction information and the authentication information.

According to an embodiment, the processor 140 may perform payment based on identification information of the external device 200. The identification information may include a user account, a phone number, an international mobile equipment identity (IMEI), an international mobile subscriber identity (IMSI), a medium access control (MAC) address, an ID, or the like.

According to an embodiment, if information corresponding to payment meets a specified first condition, the processor 140 may perform payment using the memory 120. If the information corresponding to the payment meets a specified second condition, the processor 140 may perform payment using the secure element 153. For example, if the information corresponding to the payment meets the second condition for requesting a higher security level, the processor 140 may perform the payment via the secure element 153. For another example, if the information corresponding to the payment meets the first condition for requesting a security level which is lower than that of the second condition, the processor 140 may perform the payment via the memory 120. Each of the first condition and the second condition may vary according to a security level, a payment situation (including a situation where faster access to the memory 120 should occur when it is necessary to perform emergency payment), a condition of the user, or a defect or error state of the memory 120 or the secure element 150 (e.g., it is impossible to access the secure element 150 due to hacking or breakage of the secure element 150). According to an embodiment, the information corresponding to the payment may vary according to a type of the payment. For example, if a payment amount associated with the payment is greater than a specified amount (e.g., one million Korean Won), the processor 140 may limit the payment to pay via only the secure element 153 for security.

According to an embodiment, if the payment is completed, the processor 140 may send the result of performing the payment to the external device 200 using the communication circuit 110. If the payment is completed, the processor 140 may provide a result for notifying the external device 200 of the completion of the payment to the external device 200. If the payment is completed, the processor 140 may receive the payment result from the web server 10 or the payment server 20. The processor 140 may send the received payment result to the external device 200 using the communication circuit 110.

According to various embodiments, the electronic device 100 (e.g., the processor 140) may receive first transaction information about first payment, may receive second transaction information about second payment, and may simultaneously perform the first payment and the second payment using the first transaction information and the second transaction information. For example, the electronic device 100 may receive the first transaction information associated with payment of a first product selected by the external device 200 from the external device 200. The electronic device 100 may receive the second transaction information associated with payment of a second product selected by the external device 200 from the external device 200, in a state where the payment of the first product does not progress. The electronic device 100 may display a list including the first transaction information and the second transaction information, handed off from the external device 200. The electronic device 100 may perform payment for the first transaction information and the second transaction information, included in the list, at the same time. In this case, the first product and the second product may be products sold by different sellers.

According to various embodiments, an account of the user of the electronic device 100 may be the same as an account of a user of the external device 200 or may be an account included in a group associated with the account of the user of the external device 200. The electronic device 100 may verify whether first user information corresponding to the electronic device 100 is the same as second user information corresponding to the external device 200 and may perform payment if the first user information is identical to the second user information. For example, only if the account of the user of the external device is the same as the account of the user of the electronic device 100, the electronic device 100 may perform payment requested from the external device 200 for security. The electronic device 100 may verify whether the first user information and the second user information are included in a previously specified group. For example, if the account of the user of the external device 200 is a previously specified account or an account included in a specified group (e.g., if the user of the external device 200 is included in the same group as the user of the electronic device 100), the electronic device 100 may perform payment requested from the external device 200. Also, for another example, if identification information (e.g., a phone number, an IMEI, an IMSI, a MAC address, and the like) of the external device 200 is associated with (e.g., matched with) information (e.g., an address book, a list of known devices, a list of paired devices, a device information table, and the like) stored in the electronic device 100, the electronic device 100 may perform payment requested from the external device 200.

According to various embodiments, the electronic device 100 (e.g., the processor 140) may pay part of a money amount included in transaction information. For example, if receiving a response to the first request from the electronic device 100, the external device 200 may divide a payment amount. The external device 200 may send transaction information about part of the payment amount to a first electronic device and may send transaction information about the other of the payment amount to a second electronic device. The first electronic device may pay part of the payment amount, and the second electronic device may pay the other of the payment amount.

According to various embodiments, the electronic device 100 (e.g., the processor 140) may cancel the performed payment. For example, the external device 200 may obtain a command to cancel payment from the user. The external device 200 may send a request to cancel payment to the electronic device 100. The electronic device 100 may cancel the payment based on payment history stored upon performing the payment in response to the request to cancel the payment.

Figure 3:
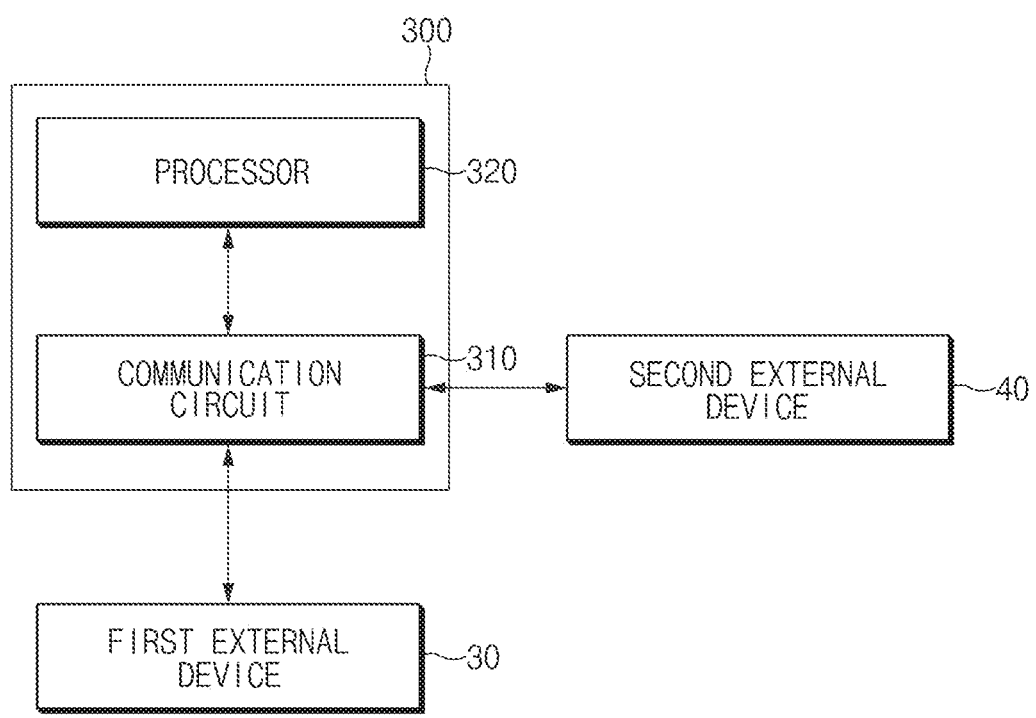
FIG. 3 is a block diagram illustrating a configuration of an electronic device according to an embodiment of the present disclosure.

FIG. 3 is a block diagram illustrating a configuration of an electronic device according to an embodiment of the present disclosure.

Referring to FIG. 3, an electronic device 300 may include a communication circuit 310 and a processor 320. Herein, the electronic device 300 may be an external device 200 shown in FIG. 1. A first external device 30 may be a web server 10 shown in FIG. 1. A second external device 40 may be an electronic device 100 shown in FIG. 2.

The communication circuit 310 may communicate with each of the first external device 30 and the second external device 40. The communication circuit (310) may include a communication circuit (e.g., a Wi-Fi module 1422, a BT module 1423, or an NFC module 1425 of FIG. 14) which supports a communication mode, for example, 3rd generation (3G), 4th generation (4G), BLE, Wi-Fi direct, or NFC. A communication mode used upon communicating with the first external device 30 may be different from a communication mode used upon communicating with the second external device 40. For example, the communication circuit 310 may communicate with the first external device 30 in a communication mode such as 3G, 4G, or Wi-Fi and may communicate with the second external device 40 in a communication mode such as BLE, Wi-Fi direct, or NFC.

The processor 320 may operatively connect with the communication circuit 310.

According to an embodiment, the processor 320 may obtain information about an item from the first external device 30 via the communication circuit 310. The item may include, for example, various items, such as goods, a service, a product, a peer-to-peer (P2P) loan, bank transaction, account transaction, or crowdfunding, necessary for payment. The processor 320 may obtain a variety of information such as address information, price information, identification information of a seller, or the like associated with the item.

According to an embodiment, the processor 320 may obtain a request for payment associated with the item. For example, the processor 320 may receive a request to pay for the item via a UI from a user of the electronic device 300.

According to an embodiment, the processor 320 may verify the second external device 40 which may perform payment using the communication circuit 310 in response to the request. For example, the processor 320 may send a request associated with payment to an electronic device around the electronic device 300 using the communication circuit 310. If the second external device 40 receives the request associated with the payment, the processor 320 may receive an indication that a specified application or a specified function may be executed, via the communication circuit 310 from the second external device 40. The processor 320 may obtain, for example, the indication from the second external device 40, an internal memory of the electronic device 300, a user input, or a third external device (not shown). The processor 320 may verify the second external device 40 based on the received indication.

According to an embodiment, the processor 320 may verify whether a specified application or a specified function includes a function of authenticating a user based on biometric information. For example, the processor 320 may verify whether an application installed in the second external device 40 or a function which may be performed in the second external device 40 includes a function of authenticating the user using fingerprint information.

According to an embodiment, the processor 320 may verify whether first user information corresponding to the electronic device 300 and second user information corresponding to the second external device 40 meet a specified condition. For example, the processor 330 may verify whether the first user information is the same as the second user information (e.g., whether a user of the electronic device 300 is the same as a user of the second external device 40) to improve security. For another example, the processor 320 may verify whether the first user information is linked to the second user information (e.g., whether the user of the electronic device 300 and the user of the second external device 40 are registered as family members).

According to an embodiment, the processor 320 may send a message, for verifying that it is possible to pay, to the second external device 40 or the third external device. If it is possible for the second external device 40 or the third external device to pay, the processor 320 may obtain information corresponding to the second external device 40 or the third external device. According to an embodiment, the second external device 40 or the third external device may be an electronic device which may pay. For example, the electronic device 300 or the second external device 40 may hand over payment to the third external device based on whether a specific situation occurs in the electronic device 300 or the second external device 40 (e.g., power of the electronic device 300 or the second external device 40 is insufficient) while payment progresses via the electronic device 300 or the second external device 40, information corresponding to the third external device which may pay (e.g., information that it is possible to pay), whether a user of the third external device is registered as a familiar member of the user, reliability with the third external device and the electronic device 300, and the like. According to an embodiment, if the electronic device 300 receives a call while progressing payment, it may hand over its payment to the second external device 40 or the third external device.

According to an embodiment, the processor 320 may send transaction information to be used for payment to the second external device 40 based on the at least verification. For example, if receiving an indication from the second external device 40, the processor 320 may send transaction information to the second external device 40. The transaction information may include transaction data corresponding to payment.

Figure 4:
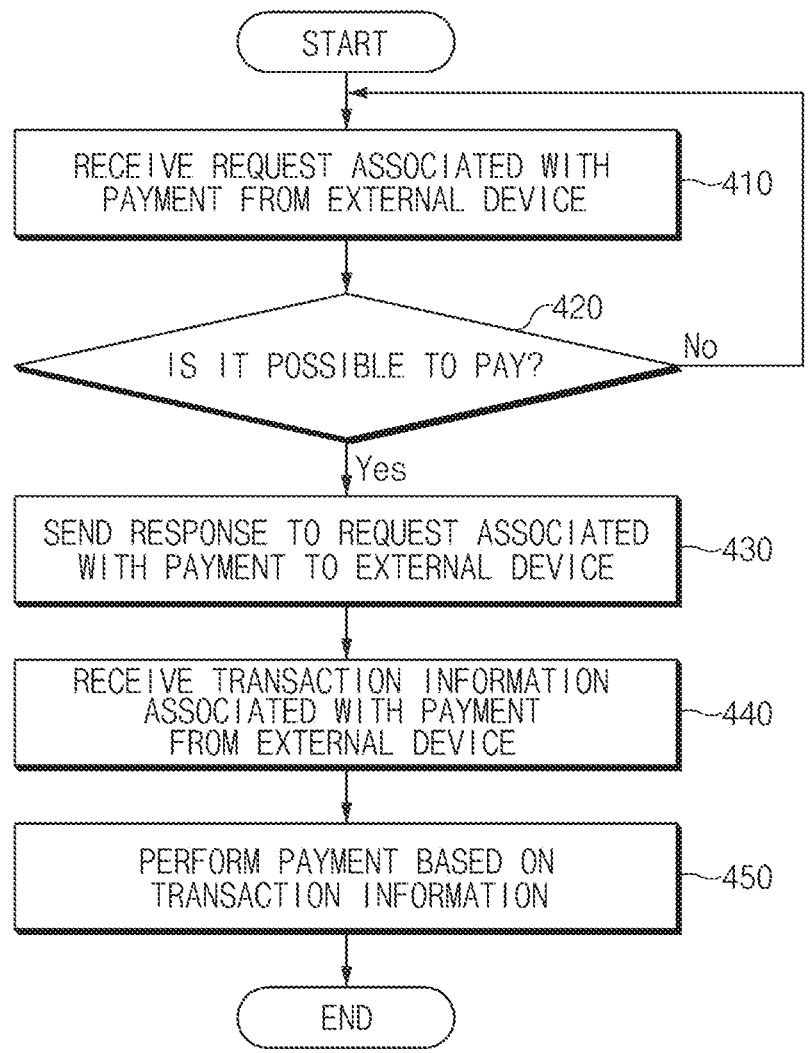
FIG. 4 is a flowchart illustrating a payment method of an electronic device according to an embodiment of the present disclosure.

FIG. 4 is a flowchart illustrating a payment method of an electronic device according to an embodiment of the present disclosure. Operations shown in FIG. 4 may include operations processed in an electronic device 100 shown in FIGS. 1 and 2. Thus, although there are contents omitted below, contents described about the electronic device 100 with reference to FIG. 1 or FIG. 2 may be applied to the operations shown in FIG. 4.

Referring to FIG. 4, in operation 410, the electronic device 100 (e.g., a processor 140 of FIG. 2) may receive a request associated with the payment to verify whether it is possible to pay from an external device 200 of FIG. 1. For example, if the external device 200 transmits a request to verify whether it is possible to pay for a product selected by the external device 200 to a random device around the external device 200, the electronic device 100 may receive the request using its communication circuit.

In operation 420, the electronic device 100 (e.g., the processor 140) may determine whether it is possible to pay based on the request associated with the payment. According to an embodiment, the electronic device 100 may determine whether it is possible to pay using information for payment (e.g., bank information, financial information, balance information, card information, or the like) stored in the electronic device 100. For example, the electronic device 100 may verify whether card information is stored in the electronic device 100. For another example, the electronic device 100 may verify whether the information for the payment is available for payment requested from the external device 200 (e.g., a type of a credit card which may pay). Also, the electronic device 100 may verify whether an available amount of a card is greater than or equal to a payment amount. According to an embodiment, the electronic device 100 may verify whether hardware for payment (e.g., a secure element 153, an input device 152, or a biometric sensor 151 of FIG. 2) is included in the electronic device 100. According to an embodiment, the electronic device 100 may determine whether it is possible to progress payment based on biometric information of its user.

If determining that it is possible to pay in operation 420, in operation 430, the electronic device 100 (e.g., the processor 140) may send a response to the request associated with the payment to the external device 200. For example, if there is information for payment (e.g., card information, information indicating that it possible to perform biometric authentication, a possibility of supporting hardware, and a possibility of supporting software) stored in the electronic device 100, the electronic device 100 may send a response for notifying the external device 200 that it is possible for the electronic device 100 to perform payment to the external device 200.

In operation 440, the electronic device 100 (e.g., the processor 140) may receive transaction information associated with payment from the external device 200. For example, the electronic device 100 may receive a second request, including at least one of an address information (e.g., a URI or a deep link) associated with electronic commerce selected by the external device 200, shopping cart information, a wish list, product information, content information, identification information of a seller (e.g., a seller ID), or an order number, from the external device 200.

In operation 450, the electronic device 100 (e.g., the processor 140) may perform payment using the received transaction information. A detailed description will be given of an operation associated with performing the payment with reference to FIG. 6.

If determining that it is impossible to pay in operation 420, for example, the electronic device 100 may fail to respond to the request associated with the payment. If there is no response from the electronic device 100 during a specified time, the external device 200 may stop the payment using the electronic device 100. For another example, if determining that it is impossible to pay in operation 420, the electronic device 100 may send a response for notifying the external device 200 that it is impossible to pay to the external device 200.

Figure 5:
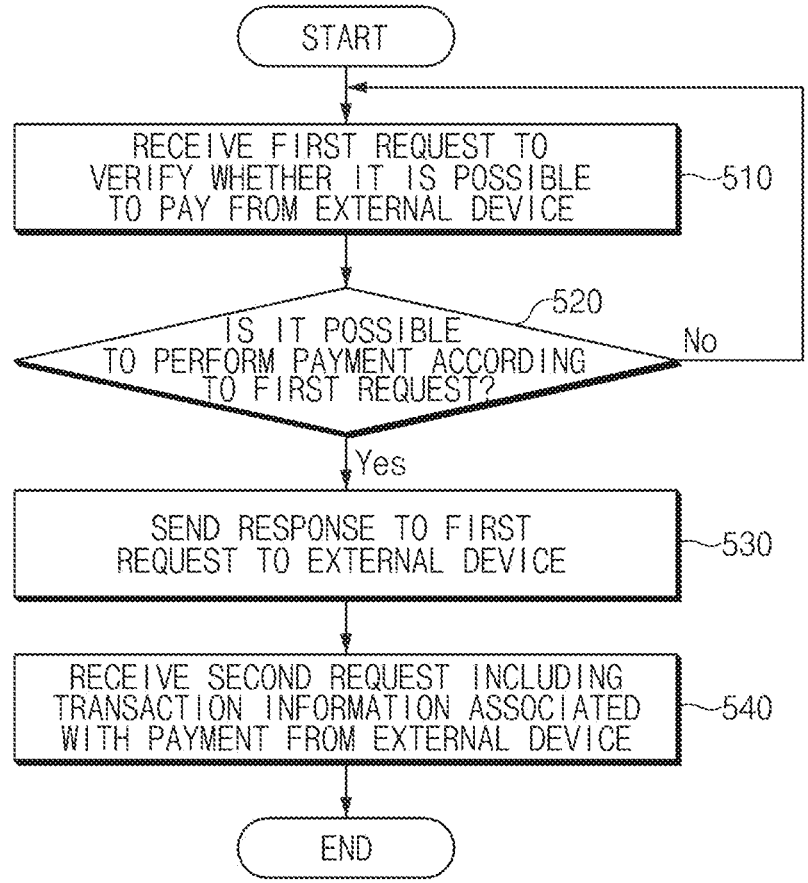
FIG. 5 is a flowchart illustrating a payment method of an electronic device according to an embodiment of the present disclosure.

FIG. 5 is a flowchart illustrating a payment method of an electronic device according to an embodiment of the present disclosure.

Operations shown in FIG. 5 may include operations processed in an electronic device 100 shown in FIGS. 1 and 2. Thus, although there are contents omitted below, contents described about the electronic device 100 with reference to FIG. 1 or 2 may be applied to the operations shown in FIG. 5.

Referring to FIG. 5, in operation 510, the electronic device 100 (e.g., a processor 140 of FIG. 2) may receive a first request to verify whether it is possible to pay from an external device 200 of FIG. 1. For example, if the external device 200 transmits a request to verify whether it is possible to pay for a product selected by the external device to a device around the external device 200, the electronic device 100 may receive the request using its communication circuit.

In operation 520, the electronic device 100 (e.g., the processor 140) may determine whether it is possible to perform payment according to the first request. According to an embodiment, the electronic device 100 may determine whether it is possible to pay using card information stored in the electronic device 100. For example, the electronic device 100 may verify whether card information is stored in the electronic device 100. Also, the electronic device 100 may verify whether stored card information is available for payment requested from the external device 200 (e.g., a type of a credit card which may pay). Also, the electronic device 100 may verify whether an available amount of a card is greater than or equal to a payment amount. For another example, the electronic device 100 may verify whether hardware for payment (e.g., a secure module or a fingerprint sensor) is included in the electronic device 100.

If determining that it is possible to pay in operation 520, in operation 530, the electronic device 100 (e.g., the processor 140) may send a response to the first request to the external device 200. For example, if there is card information stored in the electronic device 100, the electronic device 100 may send a response for notifying the external device 200 of validity of card information to the external device 200.

In operation 540, the electronic device 100 (e.g., the processor 140) may receive a second request, including transaction information associated with payment, from the external device 200. For example, the electronic device 100 may receive the second request, including a URI, a deep link, a seller ID, and an order number associated with electronic commerce selected by the external device 200, from the external device 200. The electronic device 100 may perform payment using the received transaction information.

If determining that it is impossible to pay in operation 520, for example, the electronic device 100 may fail to respond to the first request. If there is no response from the electronic device 100 during a specified time, the external device 200 may stop the payment using the electronic device 100. For another example, if determining that it is impossible to pay, the electronic device 100 may send a response for notifying the external device 200 that it is impossible to pay to the external device 200.

Figure 6:
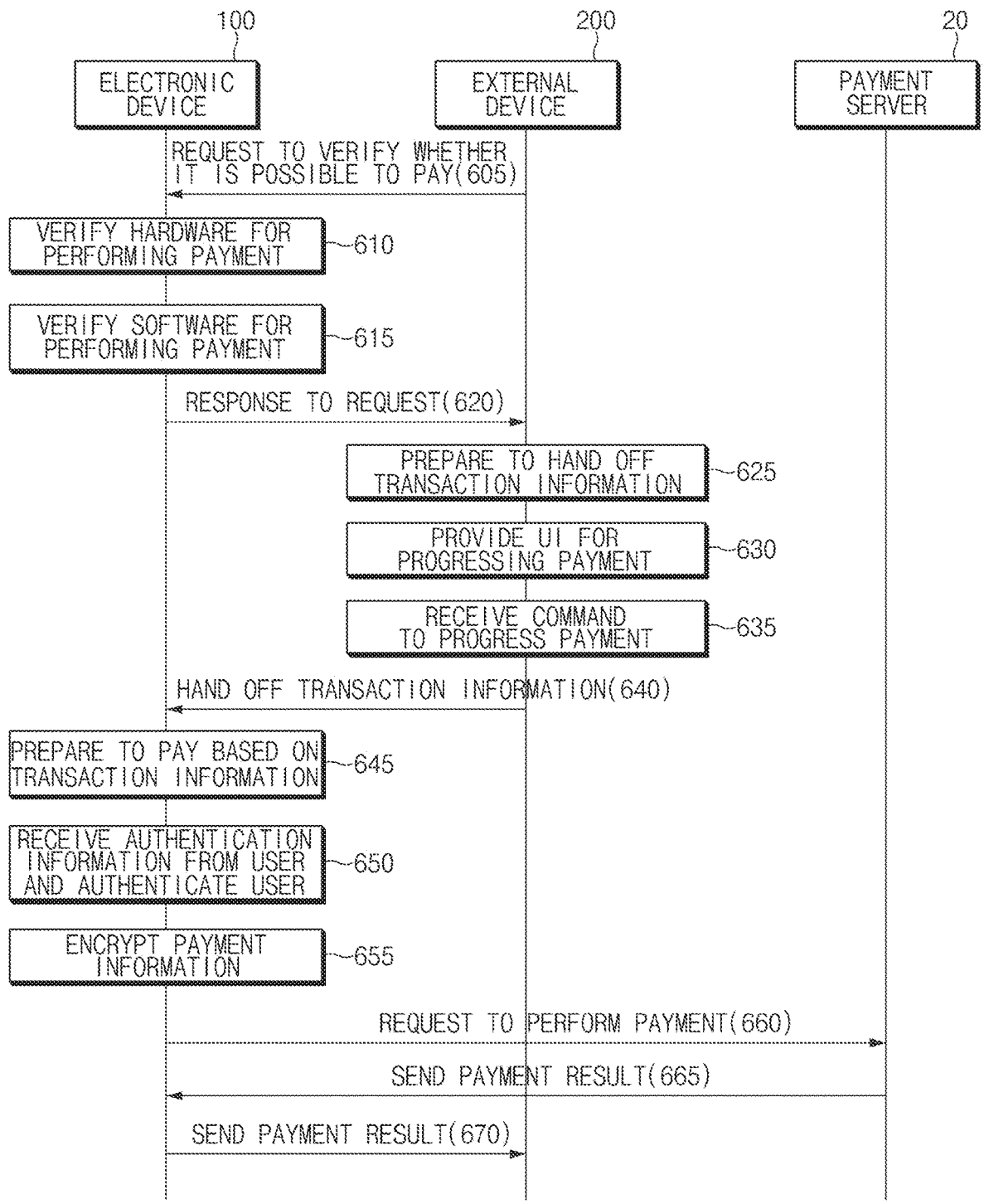
FIG. 6 is a signal sequence diagram illustrating a payment method of an electronic device according to an embodiment of the present disclosure.

FIG. 6 is a signal sequence diagram illustrating a payment method of an electronic device according to an embodiment of the present disclosure.

Operations shown in FIG. 6 may include operations processed in an electronic device 100 shown in FIGS. 1 and 2. Thus, although there are contents omitted below, contents described about the electronic device 100 with reference to FIG. 1 or 2 may be applied to the operations shown in FIG. 6.

Referring to FIG. 6, in operation 605, the electronic device 100 (e.g., a processor 140 of FIG. 2) may receive a request to verify whether it is possible to pay from an external device 200. For example, the external device 200 may send a request to verify whether it is possible to pay to a peripheral device to pay for a product a user of the external device 200 wants to purchase on a web site. The electronic device 100 may receive the request sent from the external device 200.

In operation 610, the electronic device 100 (e.g., the processor 140) may verify hardware for performing payment, included in the electronic device 100. For example, the electronic device 100 may verify whether a secure element 153, an input device 152, or a biometric sensor 151 used upon performing payment is included in the electronic device 100.

In operation 615, the electronic device 100 (e.g., the processor 140) may verify software for performing payment, included in the electronic device 100 (e.g., a memory 120 of FIG. 2). For example, the electronic device 100 may verify whether there is bank information, financial information, balance information, or card information stored in the electronic device 100. The electronic device 100 may verify whether a web site to perform payment supports payment by stored card information. For example, if information about a card of an A company is stored in the electronic device 100, the electronic device 100 may verify whether it is possible to pay using the card of the A company on a web site to perform payment. The electronic device 100 may verify an available amount of stored card information. For example, if information of a debit card is stored in the electronic device 100, the electronic device 100 may verify whether an available amount of the debit card is greater than or equal to a payment amount. Also, the electronic device 100 may verify whether an application for performing payment is installed in the electronic device 100.

In operation 620, the electronic device 100 (e.g., the processor 140) may send a response to the request to the external device 200. If verifying the hardware and the software for performing payment, the electronic device 100 may send the response to the request to the external device 200.

In operation 625, the external device 200 may prepare to hand off transaction information. For example, the external device 200 may generate transaction information including a URI, a deep link, a seller ID, and an order number associated with an electronic commerce. The external device 200 may receive transaction information from a web server 10 of FIG. 1.

In operation 630, the external device 200 may present a UI for progressing payment. For example, the external device 200 may output a pop-up including a button for receiving a command to progress payment from its user.

In operation 635, the external device 200 may receive the request to progress the payment. For example, the external device 200 may receive the command to progress the payment through the UI presented in operation 630 from the user.

In operation 640, the external device 200 may hand off transaction information to the electronic device 100. For example, the external device 200 may send the transaction information generated in operation 625 to the electronic device 100. The external device 200 may send the transaction information in a direct transmission mode (e.g., a P2P mode) or may send the transaction information to a server (e.g., a cloud server). The electronic device 100 may receive the transaction information sent from the external device 200. The electronic device 100 may obtain transaction information stored in the cloud server.

In operation 645, the electronic device 100 (e.g., the processor 140) may prepare to pay based on the transaction information. For example, the electronic device 100 may generate payment information including at least one of a product name of a product to transact based on the transaction information, seller information, a payment date, a payment time, an approval number, card information, or a payment amount. The electronic device 100 may display the payment information.

In operation 650, the electronic device 100 (e.g., the processor 140) may receive authentication information from its user and may authenticate the user. For example, the electronic device 100 may scan biometric information such as a fingerprint, an iris, a voice, a face, or a vein of the user to authenticate the user of the electronic device 100. For another example, the electronic device 100 may authenticate the user of the electronic device 100 using a personal identification number (PIN) received from the user.

In operation 655, the electronic device 100 (e.g., the processor 140) may encrypt the payment information. For example, the electronic device 100 may encrypt payment information, such as card information or user information, using an encryption program stored in the electronic device 100.

In operation 660, the electronic device 100 (e.g., the processor 140) may send a request to perform payment to a payment server 20 of FIG. 1. For example, the electronic device 100 may send an encrypted packet including a payment token and user information to the payment server 20. For another example, the electronic device 100 may send an encrypted packet to a web server (e.g., a web server 10 of FIG. 1) of a web site which sells a product.

In operation 665, the electronic device 100 (e.g., the processor 140) may receive a payment result from a payment server (e.g., the payment sever 20 of FIG. 1). For example, if the payment server succeeds in pay using a sent packet, the electronic device 100 may receive a payment result from the payment server. For another example, the electronic device 100 may receive a payment result via the web server of the web site which sells a product.

In operation 670, the electronic device 100 (e.g., the processor 140) may send the payment result to the external device 200. For example, the electronic device 100 may receive the payment result and may provide the payment result to the external device 200 to verify payment completion. For example, if receiving the payment result, the external device 200 may display a web page for providing notification that the payment is completed.

Figure 7:
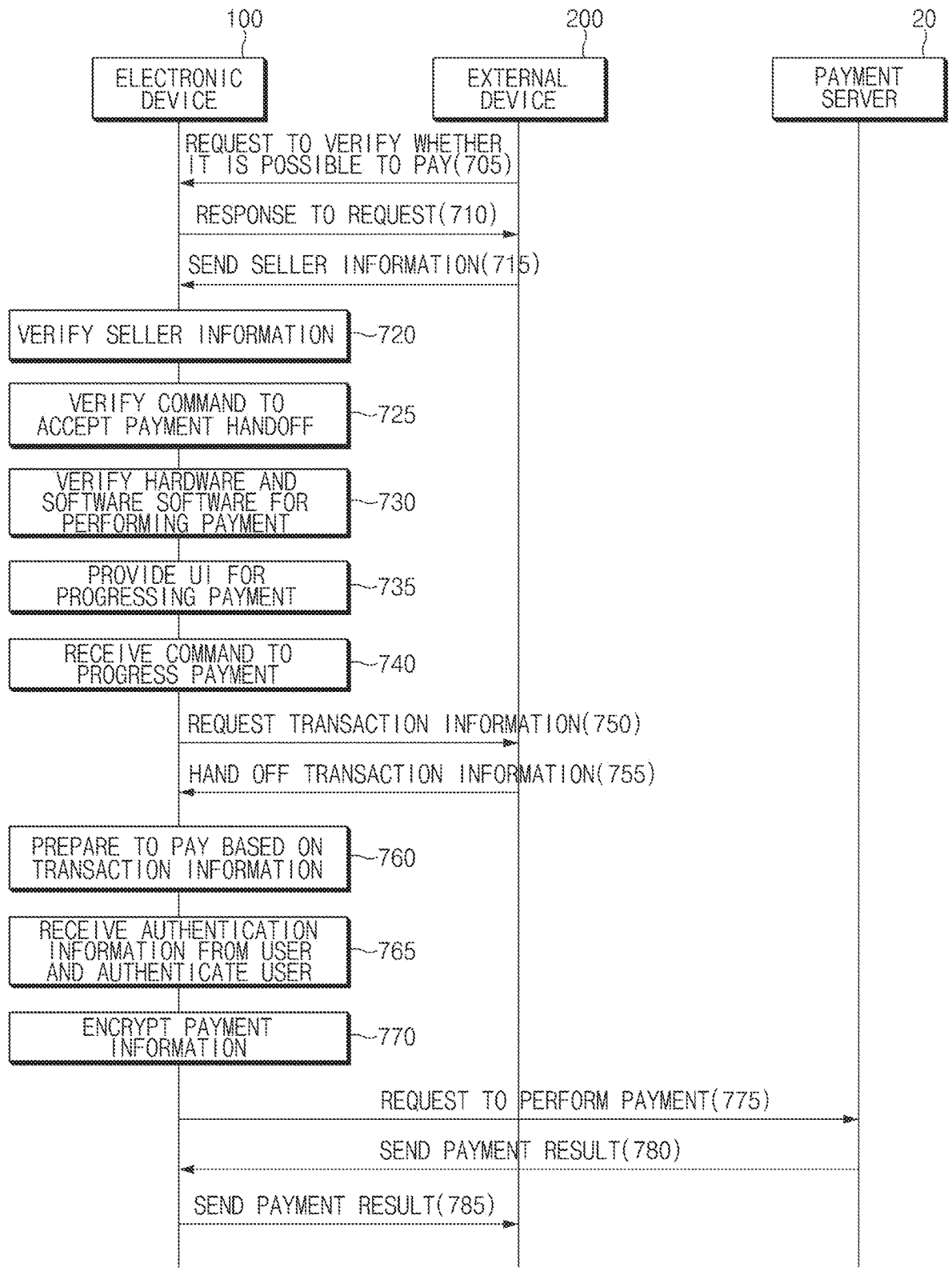
FIG. 7 is a signal sequence diagram illustrating a payment method of an electronic device according to an embodiment of the present disclosure.

FIG. 7 is a signal sequence diagram illustrating a payment method of an electronic device according to an embodiment of the present disclosure. For convenience of description, a repeated description for an operation described with reference to FIG. 4 will be omitted.

Operations shown in FIG. 7 may include operations processed in an electronic device 100 shown in FIGS. 1 and 2. Thus, although there are contents omitted below, contents described about the electronic device 100 with reference to FIG. 1 or FIG. 2 may be applied to the operations shown in FIG. 7.

Referring to FIG. 7, in operation 705, the electronic device 100 (e.g., a processor 140 of FIG. 2) may receive a request to verify whether it is possible to pay from an external device 200.

In operation 710, the electronic device 100 (e.g., the processor 140) may send a response to the request to the external device 200. For example, if receiving the request from the external device 200, the electronic device 100 may send the response to the request without a separate verification procedure.

In operation 715, the electronic device 100 (e.g., the processor 140) may receive information about a seller from the external device 200. For example, the electronic device 100 may receive seller information such as a seller ID of a selected product from the external device 200. The external device 200 may receive, for example, seller information from a shopping mall server and may send the received seller information to the electronic device 100.

In operation 720, the electronic device 100 (e.g., the processor 140) may verify the seller information. For example, the electronic device 100 may verify whether a user of the electronic device 100 may transact with the seller using a payment service provided from the electronic device 100.

In operation 725, the electronic device 100 (e.g., the processor 140) may receive a command to accept a handoff for payment. For example, the electronic device 100 may receive a command from the user via a UI for receiving the command to accept the handoff. According to an embodiment, the electronic device 100 may perform a handoff based on settings.

In operation 730, the electronic device 100 (e.g., the processor 140) may verify hardware for performing payment, included in the electronic device 100. Also, the electronic device 100 (e.g., the processor 140) may verify software for performing payment, stored in the electronic device 100 (e.g., a memory 120 of FIG. 2). For example, the electronic device 100 may verify bank information, financial information, balance information, card information, a payment application, or the like.

In operation 735, the electronic device 100 (e.g., the processor 140) may present a UI for progressing payment. For example, the electronic device 100 may output a pop-up including a button for receiving a command to progress payment from the user. According to an embodiment, the electronic device 100 (e.g., the processor 140) may automatically perform the payment based on a user setting. For example, if automatically recognizing the user of the electronic device 100 using a sensor of the electronic device 100, the electronic device 100 may progress the payment without displaying a separate UI. According to an embodiment, the electronic device 100 may progress user authentication based on a voice, an iris, a face, a fingerprint, a vein, or the like of the user and may automatically instruct to progress the payment if the user authentication is completed.

In operation 740, the electronic device 100 (e.g., the processor 140) may receive the command to progress the payment. For example, the electronic device 100 may receive the command to progress the payment via the UI presented in operation 735 from the user.

In operation 750, the electronic device 100 (e.g., the processor 140) may send a request of transaction information to the external device 200. For example, if receiving the command to progress the payment, the electronic device 100 may request the external device 200 to send transaction information to perform the payment.

In operation 755, the external device 200 may hand off the transaction information to the electronic device 100.

In operation 760, the electronic device 100 (e.g., the processor 140) may prepare to pay based on the transaction information.

In operation 765, the electronic device 100 (e.g., the processor 140) may receive authentication information from the user and may authenticate the user. According to an embodiment, the electronic device 100 may perform the authentication based on biometric information or a password (e.g., a PIN and a pattern) of the user. The electronic device 100 may perform the authentication using a trust zone or a secure module (or a secure element). According to an embodiment, the electronic device 100 may obtain the authentication information via a separate server specified by the user. According to an embodiment, the electronic device 100 may perform the authentication based on user information stored in another electronic device.

In operation 770, the electronic device 100 (e.g., the processor 140) may encrypt the payment information. According to an embodiment, the electronic device 100 may encrypt the payment information based on an encryption algorithm (e.g., a secure hash algorithm (SHA), a data encryption standard (DES), a hash, an electronic signature, and the like). According to an embodiment, the electronic device 100 may encrypt the payment information in a token mode In operation 775, the electronic device 100 (e.g., the processor 140) may send a request to perform payment to a server. According to an embodiment, the electronic device 100 may send the request to progress the payment via a server of a value added network (VAN) company to perform the payment. According to an embodiment, the electronic device 100 may include another server (e.g., a Samsung pay server, a server of an Internet only bank, and a sever of a card company) which provides a payment performance platform to perform payment.

In operation 780, the electronic device 100 (e.g., the processor 140) may receive a payment result from the server.

In operation 785, the electronic device 100 (e.g., the processor 140) may send the payment result to the external device 200.

Figure 8:
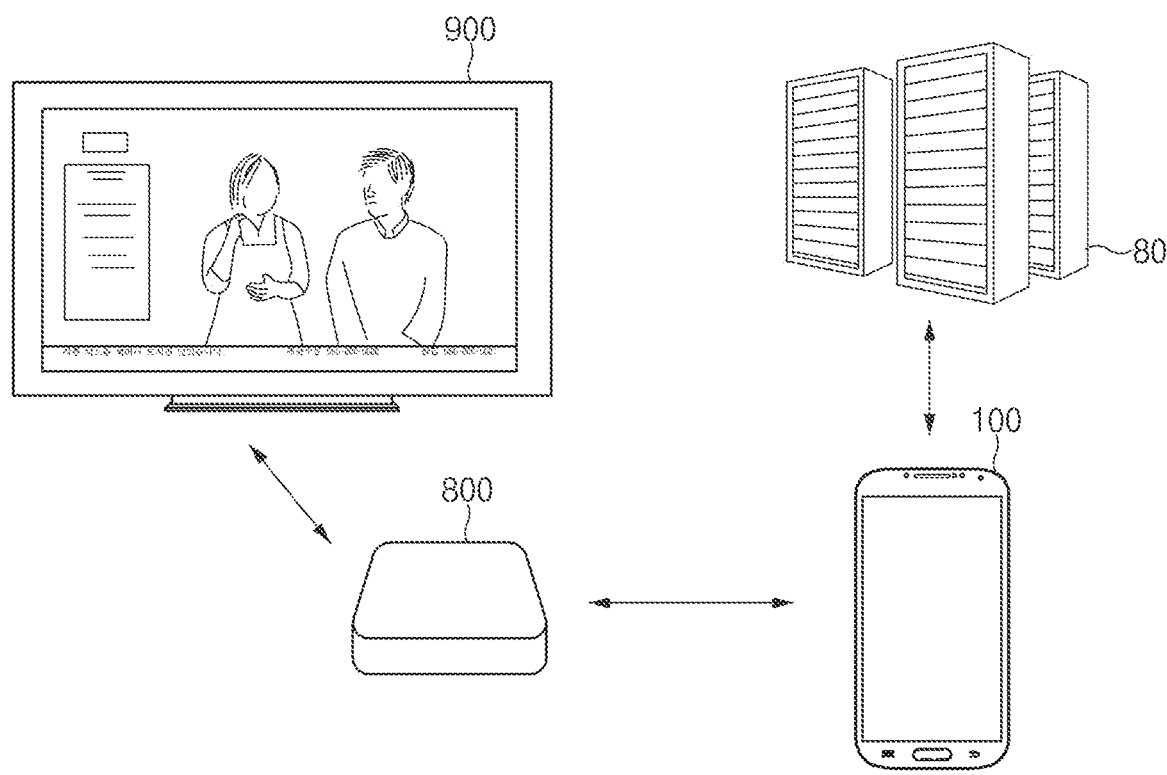
FIG. 8 is a drawing illustrating an implementation of performing payment which interworks with a television (TV) in an electronic device according to an embodiment of the present disclosure.

FIG. 8 is a drawing illustrating an implementation of performing payment which interworks with a TV in an electronic device according to an embodiment of the present disclosure.

Referring to FIG. 8, an electronic device 100 may connect with a set-top box 800 of a TV 900 and a web server 80.

According to an embodiment, the electronic device 100 may receive broadcast information from an external device and may obtain product information or identification information of a seller for a product corresponding to the broadcast information based on the broadcast information. For example, the electronic device 100 may receive information associated with a channel on the TV 900 from the TV 900 or the set-top box 800 and may obtain information about a product which is being broadcasted on the channel based on the information associated with the channel.

For example, the TV 900 may output a home shopping broadcast. Information associated with a channel of the home shopping broadcast which is being broadcasted on the TV 900 (e.g., channel information or related application information) may be stored in the set-top box 800 connected with the TV 900.

The set-top box 800 may pay for a product which is being broadcasted using the electronic device 100. For example, the set-top box 800 may send a payment request for the product which is being broadcasted to the electronic device 100. The electronic device 100 may send a response to the payment request to the set-top box 800. The set-top box 800 may send information associated with a channel of the home shopping broadcast to the electronic device 100.

According to an embodiment, the set-top box 800 may be included in the TV 900. According to an embodiment, the electronic device 100 may receive information associated with a channel from the TV 900 without the set-top box 800. According to an embodiment, the electronic device 100 may receive information about a channel which is being broadcasted (e.g., an electronic program guide (EPG)) via a separate broadcast server (not shown). The electronic device 100 may obtain information associated with a channel, information associated with a product which is being broadcasted, or information about a broadcast its user watches via the set-top box 800, a server, an external device, the TV 900, or the Internet.

The electronic device 100 may perform payment using information associated with a channel. For example, the electronic device 100 may receive transaction information about a product which is being broadcasted from the web server 80 associated with a home shopping broadcast using channel information. For another example, the electronic device 100 may receive transaction information about a product which is being broadcasted from the web server 80 by executing an application associated with the home shopping broadcast using application information. The electronic device 100 may perform payment using the received transaction information.

Referring to FIG. 8, an embodiment is exemplified as the electronic device 100 connects with the set-top box 800. Various embodiments are not limited thereto. For example, the electronic device 100 may directly connect with the TV 900 and may receive information associated with a channel from the TV 900.

Figure 9:
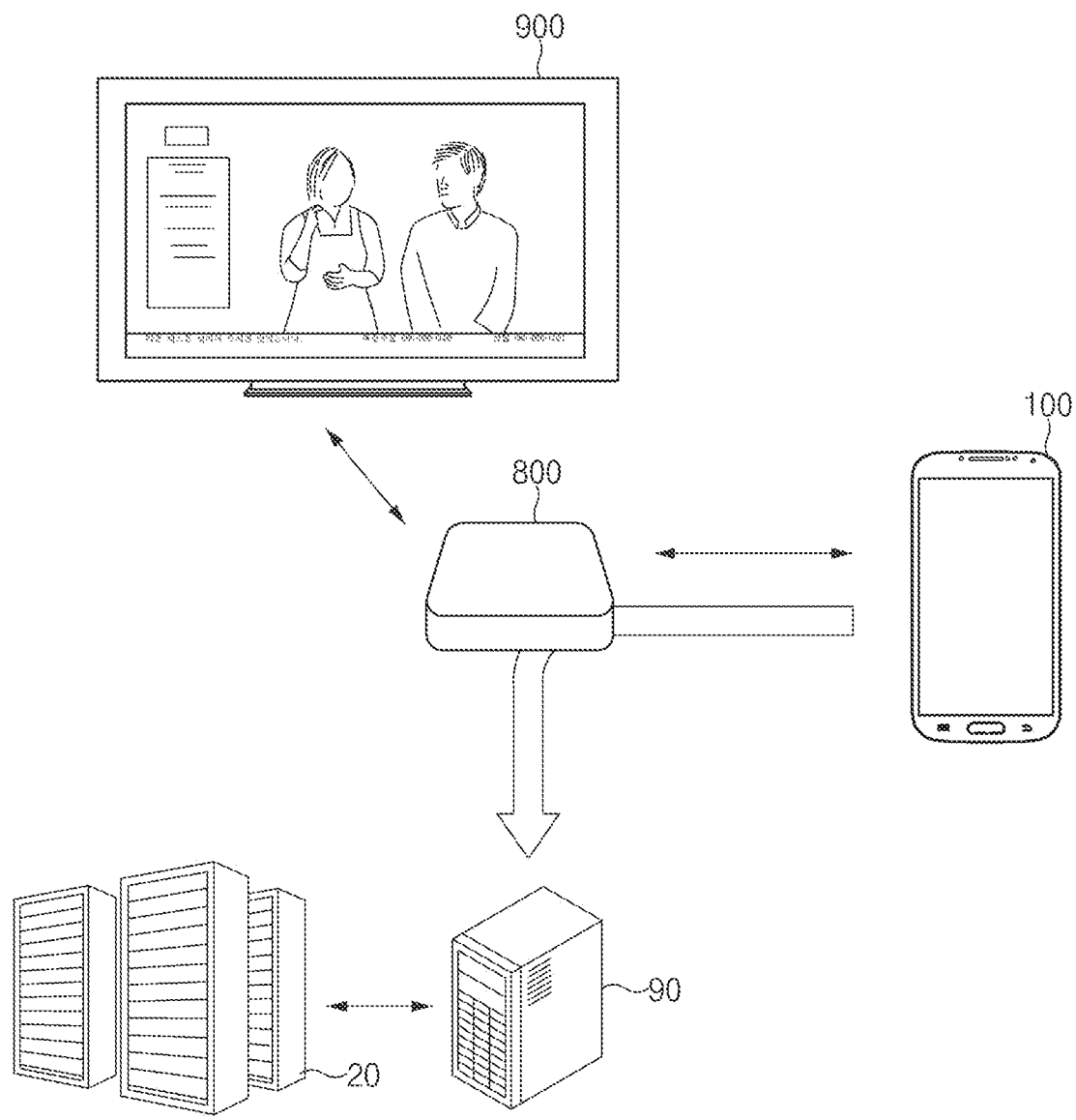
FIG. 9 is a drawing illustrating an implementation of performing payment using a biometric authentication server (e.g., a fast identity online (FIDO) server) in an electronic device according to an embodiment of the present disclosure.

FIG. 9 is a drawing illustrating an implementation of performing payment using a biometric authentication server in an electronic device according to an embodiment of the present disclosure. An electronic device 100 may obtain biometric information of its user, may generate authentication information corresponding to the biometric information, and may send the authentication information to a biometric authentication server 90. User authentication may include knowledge-based authentication (e.g., a PIN, a password, a pattern, or the like) and biometric authentication (e.g., fingerprint recognition, speaker recognition, face recognition, iris recognition, or the like). According to an embodiment, the biometric recognition may be performed in the electronic device 100 or may be performed via the biometric authentication server 90 (e.g., an FIDO server).

Referring to FIG. 9, the electronic device 100 may connect with a set-top box 800 of a TV 900 and may connect with the biometric authentication server 90 via the set-top box 800.

According to an embodiment, if receiving a second request, the electronic device 100 may obtain biometric information of the user and may send the biometric information to an external device 200 of FIG. 1 to send the biometric information to the biometric authentication server 90 via the external device 200.

For example, the electronic device 100 may send biometric information for a fingerprint, an iris, or the like for user authentication to the biometric authentication server 90 via the set-top box 800 connected with the TV 900. In this case, since the set-top box 800 has low security, there may be a probability that biometric information of the user will be hacked. Thus, to prevent the biometric information from being hacked, the electronic device 100 may send the biometric information to the biometric authentication server 90 via the external device 200 using a tunneling scheme.

For example, the electronic device 100 may encapsulate a packet including the biometric information to be sent to the biometric authentication server 90. The electronic device 100 may establish a virtual tunnel which passes the set-top box 800, between the electronic device 100 and the biometric authentication server 90. The electronic device 100 may send the encapsulated packet to the biometric authentication server 90 over the virtual tunnel. The biometric authentication server 90 may perform user authentication using the biometric information included in the received packet and biometric information stored in the biometric authentication server 90. If succeeding in the user authentication, the biometric authentication server 90 may communicate with a payment server 20 and may perform payment.

Referring to FIG. 9, an embodiment is exemplified as the biometric information is sent to the biometric authentication server 90 via the set-top box 800 connected with the TV 900. Various embodiments are not limited thereto. For example, if biometric information is sent to the biometric authentication server 90 via various devices having weak security, the electronic device 100 may use the above-mentioned tunneling scheme.

Figure 10:
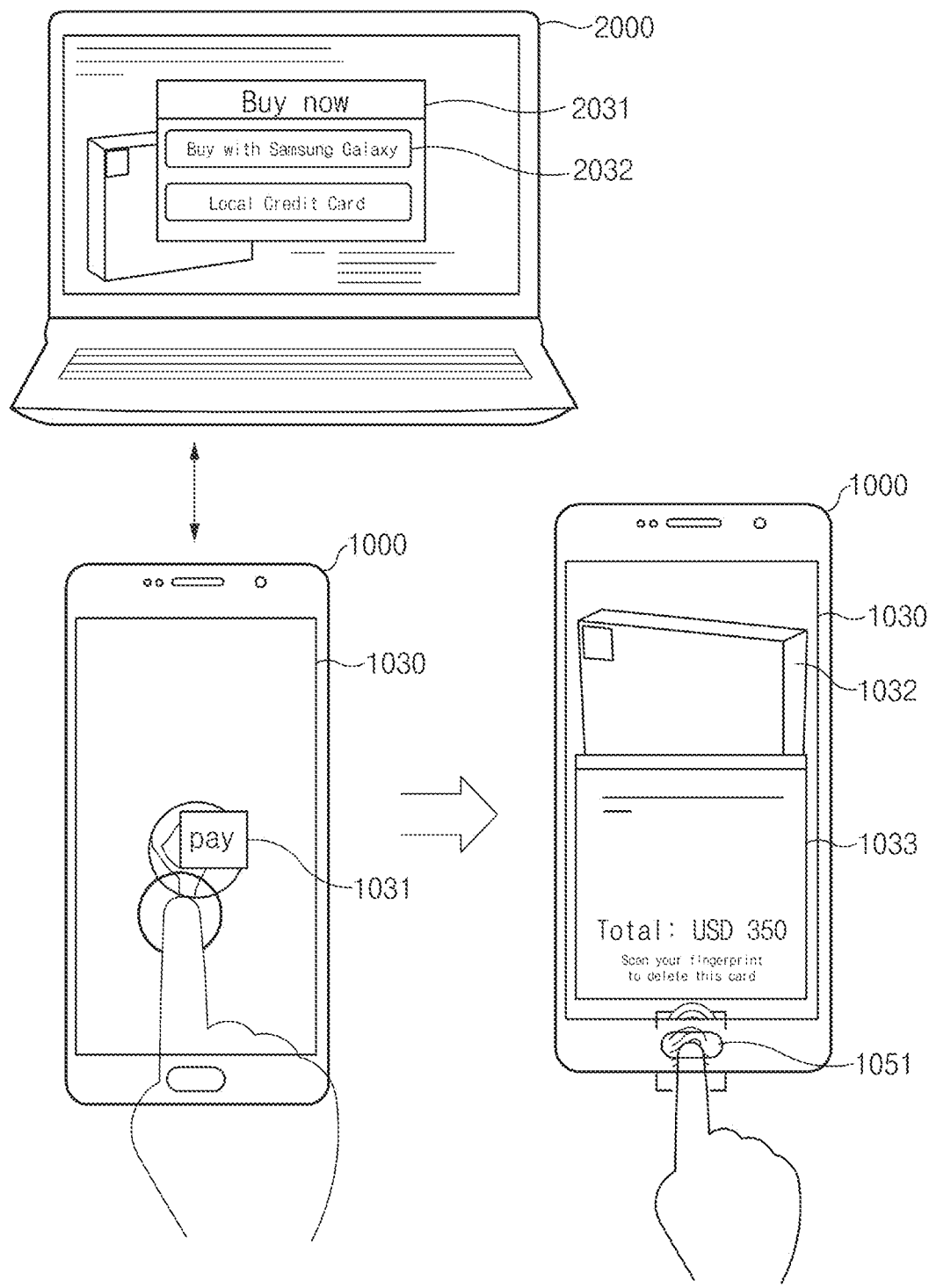
FIG. 10 is a drawing illustrating user interfaces (UIs) displayed on an electronic device and an external device according to an embodiment of the present disclosure.

FIG. 10 is a drawing illustrating UIs displayed on an electronic device and an external device according to an embodiment of the present disclosure.

Referring to FIG. 10, an electronic device 1000 may communicate with an external device 2000. The external device 2000 may display a pop-up window 2031 for inquiring whether to progress payment using the electronic device 1000. If receiving an input on a button 2032 included in the pop-up window 2031, the external device 2000 may hand off transaction information to the electronic device 1000.

If receiving the transaction information from the external device 2000, the electronic device 1000 may display an icon 1031 for handing off the transaction information to its user on a display 1030. If receiving an input on the icon 1031, the electronic device 1000 may receive the transaction information.

After receiving the input on the icon 1031, the electronic device 1000 may output a payment window 1033 including the transaction information together with information 1032 about a product on the display 1030. The payment window 1033 may output at least one of information about a model name of the product, a payment time, an approval number, a card name stored in the electronic device 1000, a card number, and a payment amount. If a fingerprint sensor 1051 recognizes a fingerprint of the user, the electronic device 1000 may perform an authentication stage for the fingerprint of the user. If authentication is completed, the electronic device 1000 may perform payment displayed on the payment window 1033.

Figure 11:
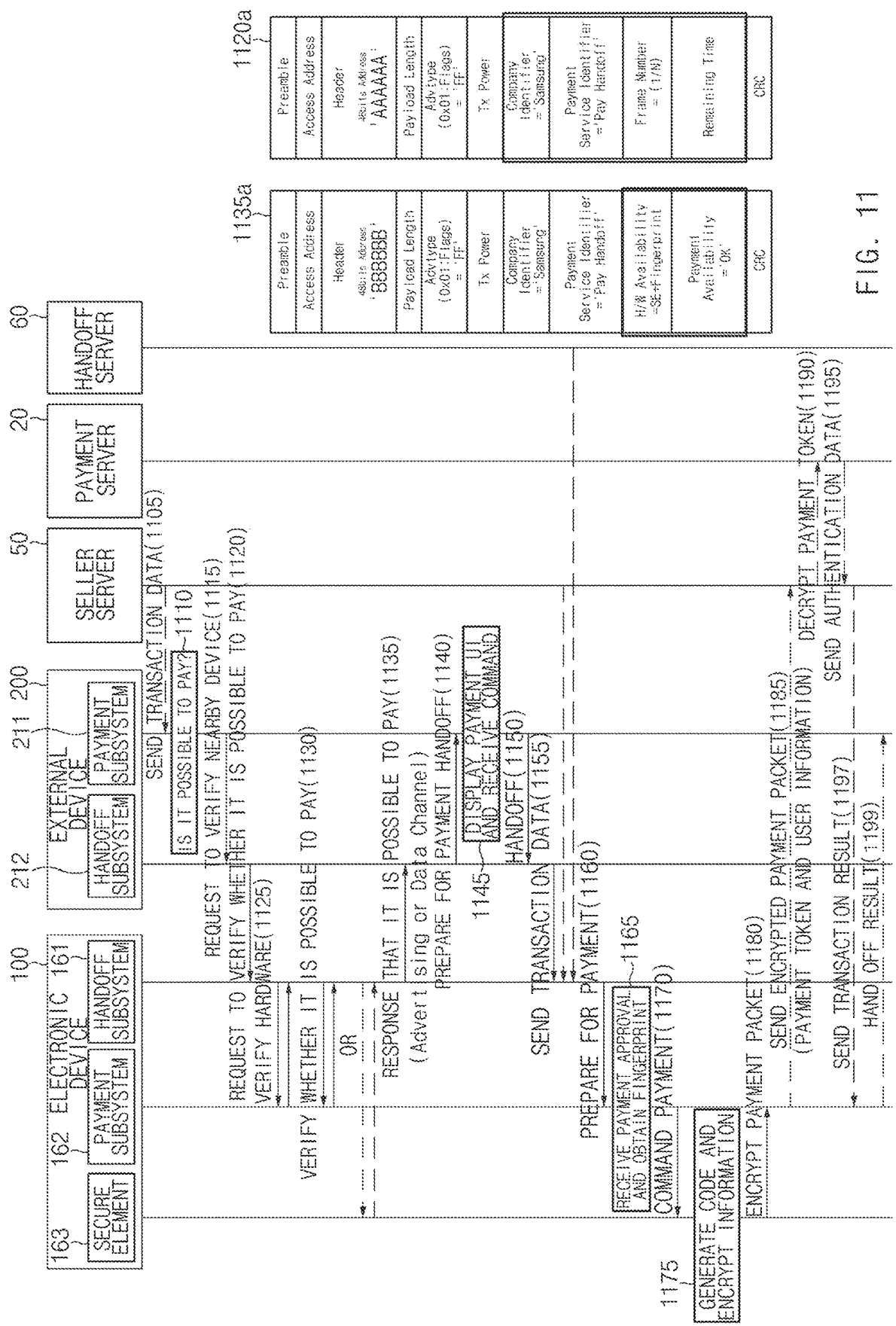
FIG. 11 is a signal sequence diagram illustrating a payment method of an electronic device according to an embodiment of the present disclosure.

FIG. 11 is a signal sequence diagram illustrating a payment method of an electronic device according to an embodiment of the present disclosure.

Referring to FIG. 11, an electronic device 100 may include a handoff subsystem 161, a payment subsystem 162, and a secure element 163. Each of the handoff subsystem 161, the payment subsystem 162, and the secure element 163 may be implemented with a separate software module. An external device 200 may include a payment subsystem 211 and a handoff subsystem 212. Each of the payment subsystem 211 and the handoff subsystem 212 may be implemented with a separate software module.

In operation 1105, the payment subsystem 211 of the external device 200 may receive transaction data from a seller server 50. The seller server 50 may provide the transaction data for a product and the like, stored in the seller server 50, to the external device 200.

In operation 1110, the payment subsystem 211 of the external device 200 may verify whether it is possible to perform payment associated with the transaction data. The external device 200 and the electronic device 100 may perform operations 1115 to 1140 below for verification.

In operation 1115, the payment subsystem 211 of the external device 200 may request the handoff subsystem 212 to verify whether it is possible for a nearby device to pay.

In operation 1120, the handoff subsystem 212 of the external device 200 may request the nearby device to verify whether it is possible to pay. The handoff subsystem 161 of the electronic device 100 adjacent to the external device 200 may receive the request.

The handoff subsystem 212 may send, for example, a packet 1120a to the handoff subsystem 161 of the electronic device 100. The packet 1120a may include information about a preamble, an access address, a header, a payload length, a transmit (Tx) power, a company ID of the external device 200, a payment service ID, a frame number, and a response remaining time.

In operation 1125, the handoff subsystem 161 of the electronic device 100 may verify whether there is hardware for payment. The handoff subsystem 161 of the electronic device 100 may request the payment subsystem 162 to verify hardware for payment (e.g., a secure element, a fingerprint sensor, or the like). The payment subsystem 162 may verify the hardware and may send the verified result to the handoff subsystem 161.

In operation 1130, the handoff subsystem 161 of the electronic device 100 may verify whether it is possible to pay. The handoff subsystem 161 may verify, for example, software for payment via the payment subsystem 162. For another example, the handoff subsystem 161 may verify payment information (e.g., card information) stored in the electronic device 100, a type of a credit card, an available amount of the credit card, or the like.

In operation 1135, if the hardware, the software, and/or the secure element are verified, the handoff subsystem 161 of the electronic device 100 may send a response that it is possible to pay to the handoff subsystem 212 of the external device 200.

The handoff subsystem 161 may send, for example, a packet 1135a to the handoff subsystem 212 of the external device 200. The packet 1135a may include information about a preamble, an access address, a header, a payload length, a Tx power, a company ID of the external device 200, a payment service ID, capability of hardware, and payment capability.

In operation 1140, the handoff subsystem 212 of the external device 200 may send a command to prepare to hand off payment to the payment subsystem 211.

In operation 1145, the payment subsystem 211 of the external device 200 may display a UI for progressing payment using the electronic device 100 on a payment UI (e.g., a pop-up window 2031 of FIG. 10) in response to the command and may receive a command to progress payment using the electronic device 100 from its user through the payment UI.

In operation 1150, the payment subsystem 211 of the external device 200 may send a command to perform a handoff to the handoff subsystem 212.

In operation 1155, the handoff subsystem 212 of the external device 200 may send transaction data to the handoff subsystem 161 of the electronic device 100 in response to the command. The transaction data may be sent from the seller server 50 or a handoff server 60 to the handoff subsystem 161 of the electronic device 100.

In operation 1160, the handoff subsystem 161 of the electronic device 100 may send a command to prepare for payment to the payment subsystem 162.

In operation 1165, the payment subsystem 162 of the electronic device 100 may receive a payment approval via a UI (e.g., an icon 1031 of FIG. 10) from the user and may obtain a fingerprint of the user.

In operation 1170, the payment subsystem 162 of the electronic device 100 may send a command to perform payment to the secure element 163.

In operation 1175, the secure element 163 of the electronic device 100 may generate a code in response to the command and may encrypt information for payment.

In operation 1180, the secure element 163 of the electronic device 100 may encrypt a payment packet and may send the encrypted payment packet to the payment subsystem 162. Alternatively, the secure element 163 of the electronic device 100 may send a command to encrypt the payment packet to the payment subsystem 162.

In operation 1185, the payment subsystem 162 of the electronic device 100 may send the encrypted payment packet to the seller server 50. The payment packet may include, for example, a payment token and user information.

In operation 1190, the seller server 50 may send the payment token to the payment server 20. The payment server 20 may decrypt the payment token.

In operation 1195, the payment server 20 may authenticate payment using the decrypted payment token and may send authentication data to the seller server 50.

In operation 1197, the seller server 50 may send a transaction result to the payment subsystem 162 of the electronic device 100.

In operation 1199, the payment subsystem 162 of the electronic device 100 may send the transaction result to the payment subsystem 211 of the external device 212.

Figure 12:
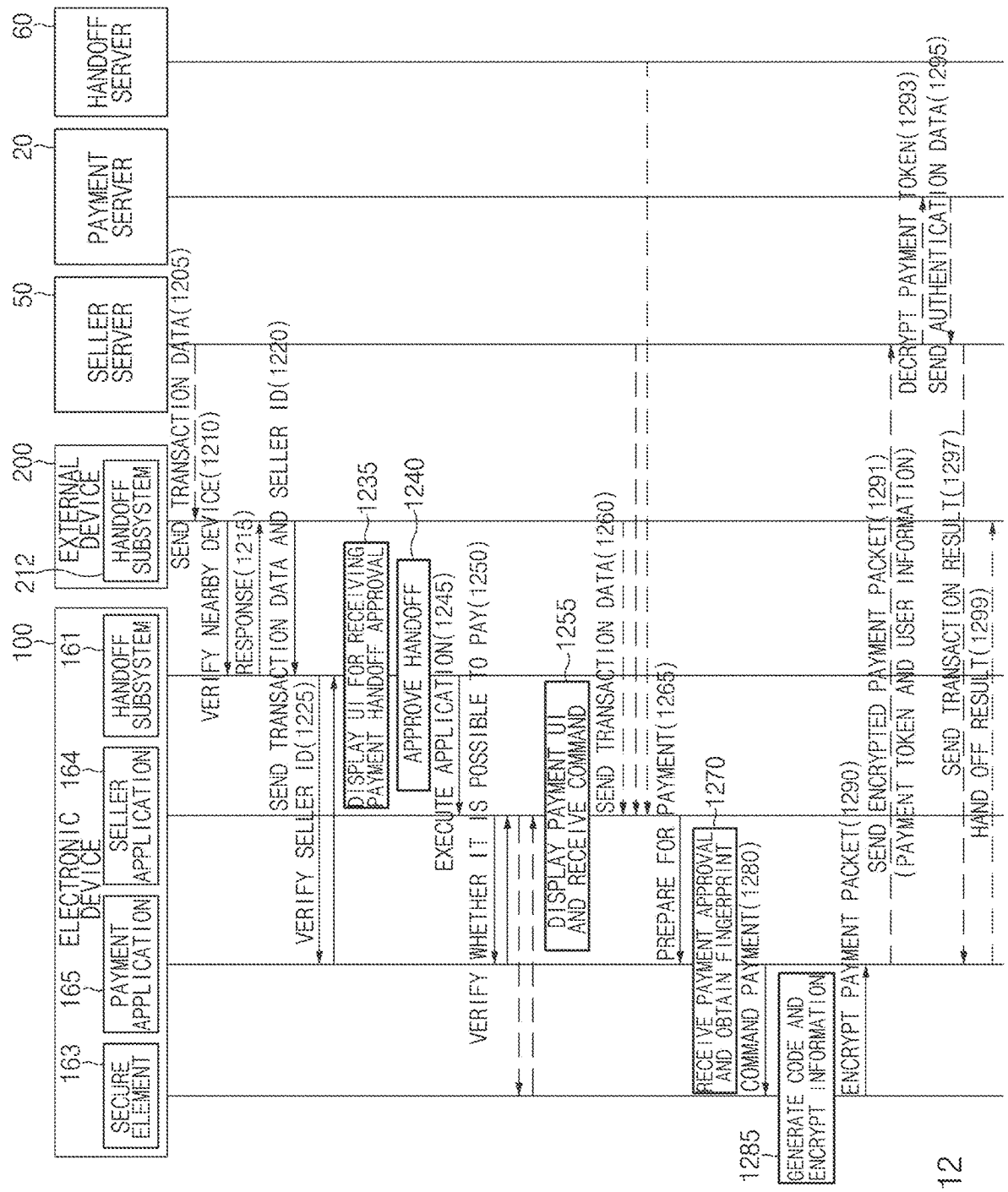
FIG. 12 is a signal sequence diagram illustrating a payment method of an electronic device according to an embodiment of the present disclosure.

FIG. 12 is a signal sequence diagram illustrating a payment method of an electronic device according to an embodiment of the present disclosure.

Referring to FIG. 12, an electronic device 100 may include a handoff subsystem 161, a secure element 163, a seller application 164, and a payment application 165. Each of the handoff subsystem 161, the secure element 163, the seller application 164, and the payment application 165 may be implemented with a separate software module. The external device 200 may include a handoff subsystem 212.

In operation 1205, the handoff subsystem 212 of the external device 200 may receive transaction data from a seller server 50. The seller server 50 may provide the transaction data for a product and the like, stored in the seller server 50, to the external device 200.

In operation 1210, the handoff subsystem 212 of the external device 200 may verify a nearby device.

In operation 1215, the handoff subsystem 161 of the electronic device 100 may respond to the handoff subsystem 212 of the external device 200 in response to the verification.

In operation 1220, the handoff subsystem 212 of the external device 200 may send the transaction data and a seller ID to the handoff subsystem 161 of the electronic device 100.

In operation 1225, the handoff subsystem 161 of the electronic device 100 may request the payment application 165 to verify the seller ID. For example, the payment application 165 may verify whether the received seller ID is an ID associated with a specified seller who sells a product and the like which are payable using the electronic device 100.

In operation 1235, the handoff subsystem 161 of the electronic device 100 may display a UI for receiving a payment handoff approval.

In operation 1240, the handoff subsystem 161 of the electronic device 100 may receive a handoff approval from the user via the UI.

In operation 1245, if the handoff is approved, the handoff subsystem 161 of the electronic device 100 may execute the seller application 164.

In operation 1250, the seller application 164 of the electronic device 100 may verify whether it is possible to pay through the payment application 165 or the secure element 163. The seller application 164 may verify, for example, software for payment through the payment application 165. For another example, the seller application 164 may verify payment information (e.g., card information) stored in the electronic device 100, a type of a credit card, an available amount of the credit card, or the like. For another example, the seller application 164 may verify whether there is hardware for payment (e.g., a secure element, a fingerprint sensor, or the like).

In operation 1255, if verifying whether it is possible to pay, the seller application 164 of the electronic device 100 may display a payment UI and may receive a command to progress payment from the user through the payment UI.

Operations 1260, 1265, 1270, 1280, 1285, 1290, 1291, 1293, 1295, 1297, and 1299 may be the same as operations 1155, 1160, 1165, 1170, 1175, 1180, 1185, 1190, 1195, 1197, and 1199 described with reference to FIG. 11, respectively.

According to an embodiment, an electronic device may include a communication circuit configured to communicate with an external device and a processor configured to operatively connect with the communication circuit. The processor may be configured to receive a request associated with payment from the external device via the communication circuit, verify whether it is possible for the electronic device to perform the payment in response to the request, receive transaction information associated with the payment via the communication circuit from the external device based on the at least verification that it is possible for the electronic device to perform the payment, and perform the payment based on the at least transaction information.

According to an embodiment, the processor may be configured to send an indication corresponding to the verification to the external device.

According to an embodiment, the processor may be configured to verify whether it is possible to perform the payment using at least one of a biometric sensor, a secure element, or an input device included in the electronic device.

According to an embodiment, the processor may be configured to verify whether it is possible to perform the payment based on bank information or card information stored in the electronic device.

According to an embodiment, the processor may be configured to store bank information or card information in a secure element included in the electronic device.

According to an embodiment, the electronic device may further include a memory or a secure element operatively connected with the processor. The processor may be configured to perform the payment using the memory if information corresponding to the payment meets a specified first condition and perform the payment using the secure element if the information corresponding to the payment meets a specified second condition.

According to an embodiment, the electronic device may further include a display operatively connected with the processor. The processor may be configured to display a screen for performing the payment on the display.

According to an embodiment, the processor may be configured to obtain biometric information from a user of the electronic device and perform the payment using the biometric information.

According to an embodiment, the processor may be configured to send the performed result corresponding to the payment to the external device using the communication circuit if the payment is completed.

According to an embodiment, the processor may be configured to receive broadcast information from the external device and obtain product information and identification information of a seller for a product corresponding to the broadcast information based on the at least broadcast information.

According to an embodiment, the processor may be configured to receive transaction information including address information associated with the payment, shopping cart information, a wish list, product information, content information, identification information of a seller, or an order number.

According to an embodiment, the processor may be configured to obtain biometric information of a user of the electronic device, generate authentication information corresponding to the biometric information, and send the authentication information to an authentication server.

According to an embodiment, the processor may be configured to receive a request associated with first payment from the external device, verify whether it is possible for the electronic device to perform the first payment based on the request associated with the first payment, receive a request associate with second payment from the external device, verify whether it is possible for the electronic device to perform the second payment based on the request associated with the second payment, receive first transaction information associated with the first payment from the external device, receive second transaction information associated with the second payment from the external device, and simultaneously perform the first payment and the second payment based on the first transaction information and the second transaction information.

According to an embodiment, the processor may be configured to pay part of a payment amount for the payment based on the transaction information.

According to an embodiment, the communication circuit may be configured to support short range communication. The processor may be configured to receive a request through the short range communication.

According to an embodiment, an electronic device may include a communication circuit configured to communicate with a first external device and a second external device and a processor configured to operatively connect with the communication circuit. The processor may be configured to obtain information about an item from the first external device, obtain a request for payment associated with the item, verify the second external device for performing the payment using the communication circuit based on the at least request, and send transaction information to be used for the payment to the second external device based on the at least verification.

According to an embodiment, the processor may be configured to verify whether first user information corresponding to the electronic device and second user information corresponding to the second external device meet a specified condition.

According to an embodiment, the processor may be configured to perform the verifying based on at least an indication that the second external device may execute a specified application or a specified function.

According to an embodiment, the processor may be configured to obtain the indication from the second external device, an internal memory of the electronic device, a user input, or a third external device.

According to an embodiment, the processor may be configured to verify whether the specified application or the specified function includes a function of authenticating a user based on biometric information.

According to an embodiment, the processor may be configured to send transaction information including transaction data corresponding to the payment to the second external device.

According to an embodiment, the processor may be configured to send a message, for verifying that it is possible to pay, to the second external device or the third external device if the electronic device meets a specified condition and obtain information corresponding to the second external device or the third external device if it is possible for the second external device or the third external device to pay.

According to an embodiment, the communication circuit may be configured to support short range communication. The processor may be configured to perform the verifying through the short range communication.

According to an embodiment, a method for operating an electronic device may include receiving a request associated with payment corresponding to an external device from the external device through short range communication using a communication module of the external device, determining whether it is possible for the electronic device to perform the payment in response to the at least request using a processor of the electronic device, receiving transaction information associated with the payment from the external device based on the at least determination, and performing the payment based on the at least transaction information.

According to an embodiment, the method may further include sending a response to the request to the external device based on the at least determination.

According to an embodiment, the performing of the payment may include performing the payment based on identification information of the external device.

According to an embodiment, the identification information may include a user account, a phone number, an IMEI, an IMSI, a MAC address, or an ID.

According to an embodiment, the transaction information may include at least one of transaction data corresponding to the payment, product information associated with a product corresponding to the payment, an image of the product corresponding to the payment, or an address (e.g., a URL) of a shopping mall corresponding to the payment.

According to an embodiment, the performing of the payment may include verifying whether first user information corresponding to the electronic device is identical to second user information corresponding to the external device and performing the payment if the first user information is identical to the second user information.

According to an embodiment, the determining may include verifying whether the first user information or the second user information is included in a specified group.

According to an embodiment, a portable phone device may include a communication circuit configured to perform short range communication with an external device and a processor configured to operatively connect with the communication circuit. The processor may be configured to receive a request associated with payment from the external device through the short range communication, verify whether it is possible for the electronic device to perform the payment in response to the request, and perform the payment based on the at least verification that it is possible for the electronic device to perform the payment.

According to an embodiment, the processor may be configured to receive transaction information associated with the payment based on at least part of the request from the external device and perform the payment based on the at least transaction information.

According to an embodiment, the processor may be configured to send an indication, corresponding to the verification that it is possible for the electronic device to perform the payment, as a response to the request, to the external device.

According to an embodiment, the processor may be configured to receive transaction information associated with the payment from the external device after sending the response and perform the payment based on the at least transaction information.

According to an embodiment, an electronic device may include a communication circuit configured to communicate with an external device, a memory configured to store at least one payment information, and a processor configured to electrically connect with the communication circuit and the memory. The processor may be configured to receive a first request for verifying whether it is possible to pay from the external device, send a response to the first request to the external device, and receive a second request including transaction information associated with payment from the external device.

According to an embodiment, the processor may be configured to verify whether it is possible to pay using at least one payment information in response to the first request and send the response to the first request to the external device based on the verified result.

According to an embodiment, the processor may be configured to perform the payment using the at least one payment information and the transaction information in response to the second request.

According to an embodiment, the processor may be configured to receive transaction information, including at least one of a URI, identification information of a seller, or an order number associated with the payment, via the communication circuit from the external device.

According to an embodiment, the electronic device may further include a display. The processor may be configured to present a screen for performing the payment on the display based on the URI.

According to an embodiment, the processor may be configured to receive authentication information from a user of the electronic device if the second request is received and perform the payment using the authentication information.

According to an embodiment, the processor may be configured to send a result for notifying the external device of completion of the payment to the external device via the communication circuit if the payment is completed.

According to an embodiment, the external device may be a TV or a set-top box of the TV. The processor may be configured to receive information associated with a channel on the TV from the TV or the set-top box and obtain information about a product which is being broadcasted on the channel based on the information associated with the channel.

According to an embodiment, the processor may be configured to receive first transaction information about first payment via the communication circuit, receive second transaction information about second payment via the communication circuit, and simultaneously perform the first payment and the second payment using the first transaction information and the second transaction information.

According to an embodiment, the electronic device may have the same a user account as a user account of the external device or may have an account included in a group associated with the user account of the external device.

According to an embodiment, the processor may be configured to pay part of a money amount included in the transaction information.

According to an embodiment, the processor may be configured to obtain biometric information of a user of the electronic device and send the biometric information to the external device to send the biometric information to a fast identity online (FIDO) server via the external device.

Figure 13:
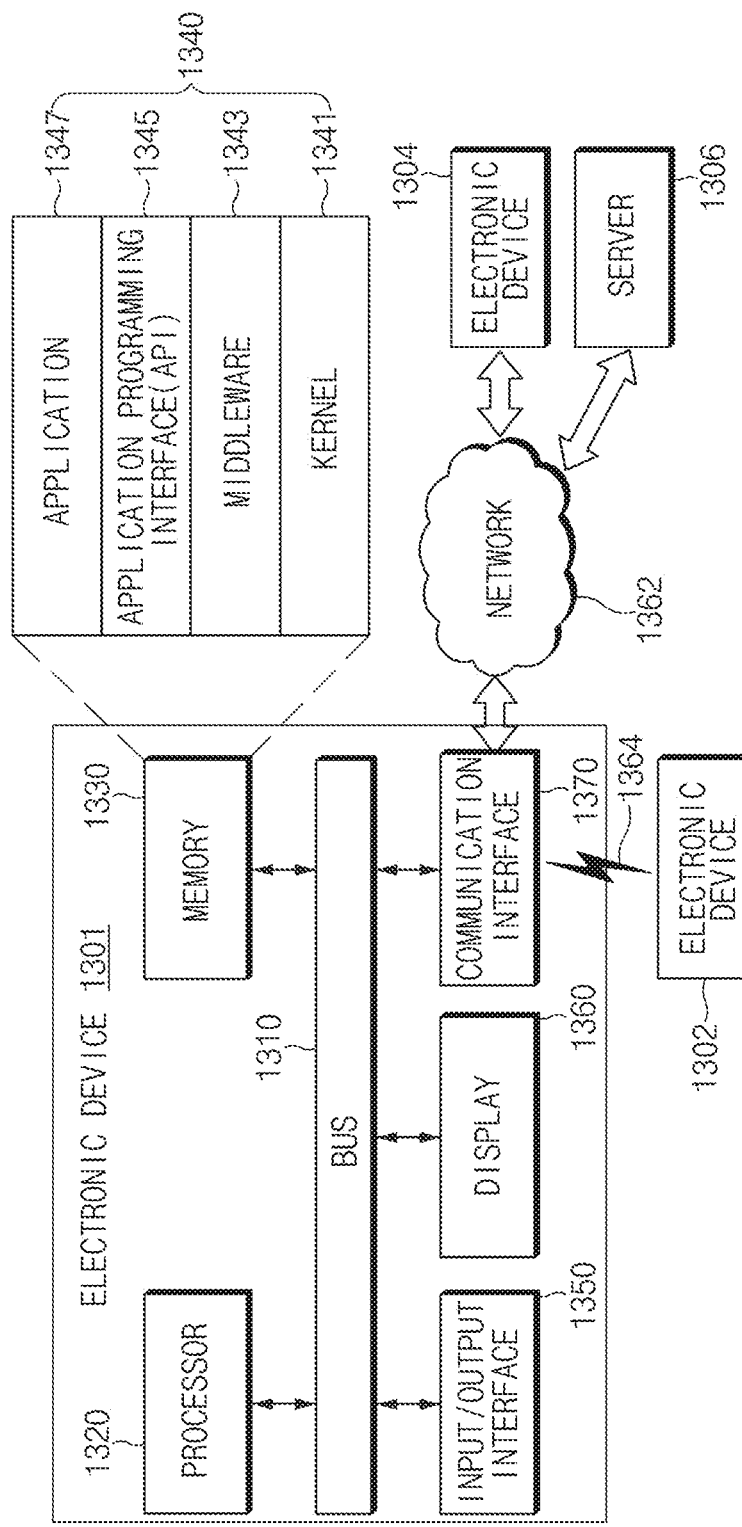
FIG. 13 is a block diagram illustrating a configuration of an electronic device in a network environment according to various embodiments of the present disclosure.

FIG. 13 is a block diagram illustrating a configuration of an electronic device in a network environment according to various embodiments of the present disclosure.

Referring to FIG. 13, in various embodiments, an electronic device 1301 may connect with a first external electronic device 1302 over local-area communication 1364 or may connect with a second external electronic device 1304 or a server 1306 over a network 1362. The electronic device 1301 may include a bus 1310, a processor 1320, a memory 1330, an input/output (I/O) interface 1350, a display 1360, and a communication interface 1370. In various embodiments, at least one of the components of the electronic device 1301 may be omitted from the electronic device 1301, and other components may be additionally included in the electronic device 1301.

The bus 1310 may include, for example, a circuit which connects the components 1320 to 1370 with each other and sends communication (e.g., a control message and/or data) between the components 1320 to 1370.

The processor 1320 may include one or more of a CPU, an AP, or a communication processor (CP). The processor 1320 may perform, for example, calculation or data processing about control and/or communication of at least another of the components of the electronic device 1301.

The memory 1330 may include a volatile and/or non-volatile memory. The memory 1330 may store, for example, a command or data associated with at least another of the components of the electronic device 1301. According to an embodiment, the memory 1330 may software and/or a program 1340. The program 1340 may include, for example, a kernel 1341, a middleware 1343, an application programming interface (API) 1345, and/or at least one application program 1347 (or "at least one application"), and the like. At least part of the kernel 1341, the middleware 1343, or the API 1345 may be referred to as an operating system (OS).

The kernel 1341 may control or manage, for example, system resources (e.g., the bus 1310, the processor 1320, or the memory 1330, and the like) used to execute an operation or function implemented in the other programs (e.g., the middleware 1343, the API 1345, or the application program 1347). Also, as the middleware 1343, the API 1345, or the application program 1347 accesses a separate component of the electronic device 1301, the kernel 1341 may provide an interface which may control or manage system resources.

The middleware 1343 may play a role as, for example, a go-between such that the API 1345 or the application program 1347 communicates with the kernel 1341 to communicate data with the kernel 1341.

Also, the middleware 1343 may process one or more work requests, received from the at least one application program 1347, in order of priority. For example, the middleware 1343 may assign priority which may use system resources (the bus 1310, the processor 1320, or the memory 1330, and the like) of the electronic device 1301 to at least one of the at least one application program 1347. For example, the middleware 1343 may perform scheduling or load balancing for the one or more work requests by processing the one or more work requests in order of priority assigned to the at least one of the at least one application program 1347.

The API 1345 may be, for example, an interface in which the application program 1347 controls a function provided from the kernel 1341 or the middleware 1343. For example, the API 1345 may include at least one interface or function (e.g., a command) for file control, window control, image processing, or text control, and the like.

The I/O interface 1350 may play a role as, for example, an interface which may send a command or data, input from a user or another external device, to another component (or other components) of the electronic device 1301. Also, the I/O interface 1350 may output a command or data, received from another component (or other components) of the electronic device 1301, to the user or the other external device.

The display 1360 may include, for example, a liquid crystal display (LCD), a light emitting diode (LED) display, an organic LED (OLED) display, a microelectromechanical systems (MEMS) display, or an electronic paper display. The display 1360 may display, for example, a variety of content (e.g., text, an image, a video, an icon, or a symbol, and the like) to the user. The display 1360 may include a touch screen, and may receive, for example, a touch, a gesture, proximity, or a hovering input using an electronic pen or part of a body of the user.

The communication interface 1370 may establish communication between, for example, the electronic device 1301 and an external device (e.g., the first external electronic device 1302, the second external electronic device 1304, or the server 1306). For example, the communication interface 1370 may connect to the network 1362 through wireless communication or wired communication and may communicate with the external device (e.g., the second external electronic device 1304 or the server 1306).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, the local-area communication 1364. The local-area communication 1364 may include, for example, at least one of Wi-Fi communication, BT communication, NFC communication, magnetic stripe transmission (MST) communication, or GNSS communication, and the like.

An MST module may generate a pulse based on transmission data using an electromagnetic signal and may generate a magnetic field signal based on the pulse. The electronic device 1301 may send the magnetic field signal to a POS system. The POS system may restore the data by detecting the magnetic field signal using an MST reader and converting the detected magnetic field signal into an electric signal.

The GNSS may include, for example, at least one of a global positioning system (GPS), a Glonass, a Beidou navigation satellite system (hereinafter referred to as "Beidou"), or a Galileo (i.e., the European global satellite-based navigation system) according to an available area or a bandwidth, and the like. Hereinafter, the "GPS" used herein may be interchangeably with the "GNSS." The wired communication may include at least one of, for example, universal serial bus (USB) communication, high definition multimedia interface (HDMI) communication, recommended standard 232 (RS-232) communication, or plain old telephone service (POTS) communication, and the like. The network 1362 may include a telecommunications network, for example, at least one of a computer network (e.g., a local area network (LAN) or a wide area network (WAN)), the Internet, or a telephone network.

Each of the first and second external electronic devices 1302 and 1304 may be the same as or different device from the electronic device 1301. According to an embodiment, the server 1306 may include a group of one or more servers. According to various embodiments, all or some of operations executed in the electronic device 1301 may be executed in another electronic device or a plurality of electronic devices (e.g., the first external electronic device 1302, the second external electronic device 1304, or the server 1306). According to an embodiment, if the electronic device 1301 should perform any function or service automatically or according to a request, it may request another device (e.g., the first external electronic device 1302, the second external electronic device 1304, or the server 1306) to perform at least part of the function or service, rather than executing the function or service for itself or in addition to the function or service. The other electronic device (e.g., the first external electronic device 1302, the second external electronic device 1304, or the server 1306) may execute the requested function or the added function and may transmit the executed result to the electronic device 1301. The electronic device 1301 may process the received result without change or additionally and may provide the requested function or service. For this purpose, for example, cloud computing technologies, distributed computing technologies, or client-server computing technologies may be used.

Figure 14:
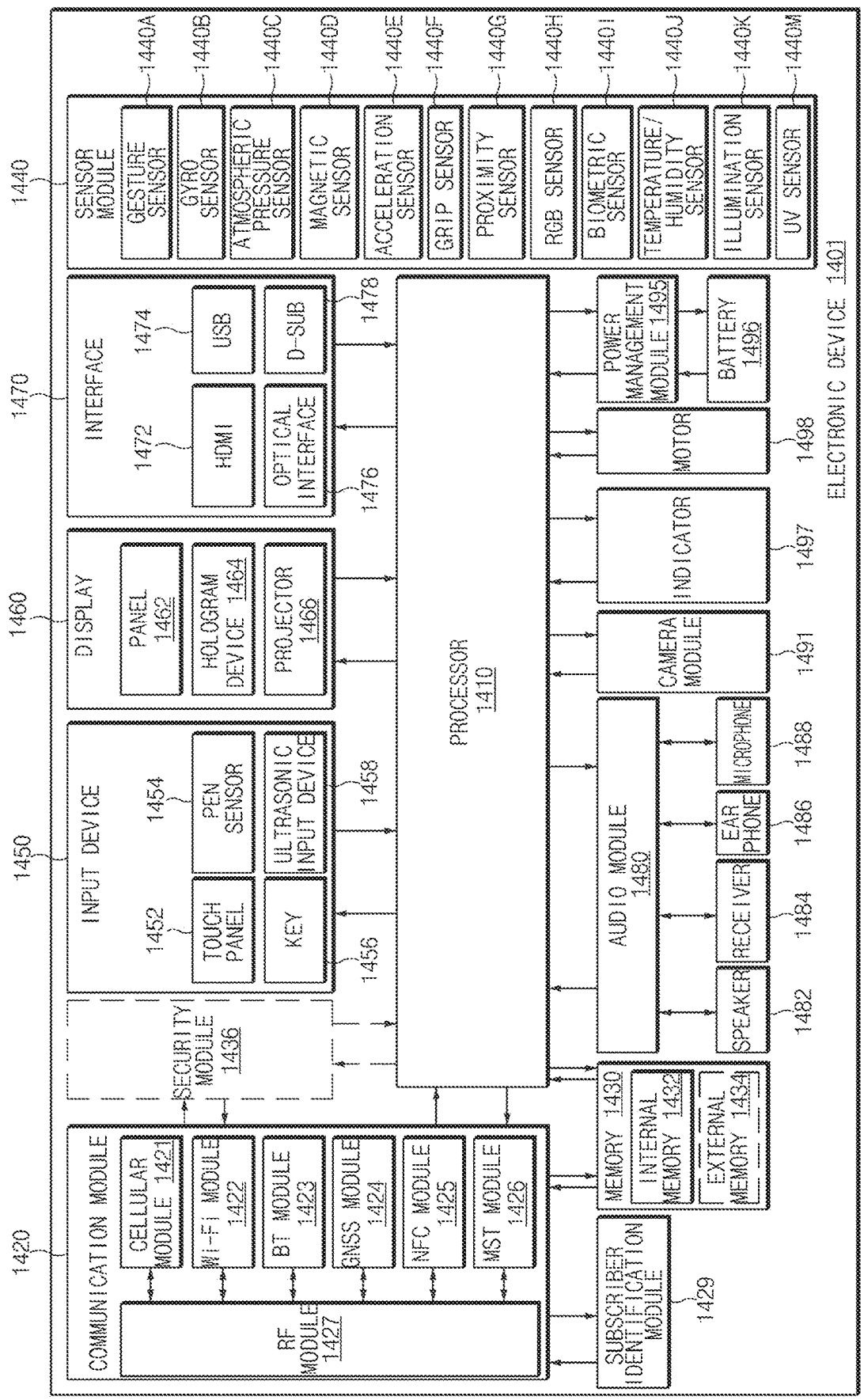
FIG. 14 is a block diagram illustrating a configuration of an electronic device according to various embodiments of the present disclosure.

FIG. 14 is a block diagram illustrating a configuration of an electronic device according to various embodiments of the present disclosure.

Referring to FIG. 14, an electronic device 1401 may include, for example, all or part of an electronic device 1301 shown in FIG. 13. The electronic device 1401 may include one or more processors 1410 (e.g., APs), a communication module 1420, a subscriber identification module (SIM) 1429, a memory 1430, a secure module 1436, a sensor module 1440, an input device 1450, a display 1460, an interface 1470, an audio module 1480, a camera module 1491, a power management module 1495, a battery 1496, an indicator 1497, and a motor 1498.

The processor 1410 may execute, for example, an OS or an application program to control a plurality of hardware or software components connected thereto and may process and compute a variety of data. The processor 1410 may be implemented with, for example, a system on chip (SoC). According to an embodiment, the processor 1410 may include a graphic processing unit (GPU) (not shown) and/or an image signal processor (ISP) (not shown). The processor 1410 may include at least some (e.g., a cellular module 1421) of the components shown in FIG. 14. The processor 1410 may load a command or data, received from at least one of other components (e.g., a non-volatile memory), to a volatile memory to process the data and may store various data in a non-volatile memory.

The communication module 1420 may have the same or similar configuration to a communication interface 1370 of FIG. 13. The communication module 1420 may include, for example, the cellular module 1421, a Wi-Fi module 1422, a BT module 1423, a GNSS module 1424 (e.g., a GPS module, a Glonass module, a Beidou module, or a Galileo module), a NFC module 1425, an MST module 1426, and a radio frequency (RF) module 1427.

The cellular module 1421 may provide, for example, a voice call service, a video call service, a text message service, or an Internet service, and the like over a communication network. According to an embodiment, the cellular module 1421 may identify and authenticate the electronic device 1401 in a communication network using the SIM 1429 (e.g., a SIM card). According to an embodiment, the cellular module 1421 may perform at least some of functions which may be provided by the processor 1410. According to an embodiment, the cellular module 1421 may include a CP.

The Wi-Fi module 1422, the BT module 1423, the GNSS module 1424, the NFC module 1425, or the MST module 1426 may include, for example, a processor for processing data communicated through the corresponding module. According to various embodiments, at least some (e.g., two or more) of the cellular module 1421, the Wi-Fi module 1422, the BT module 1423, the GNSS module 1424, the NFC module 1425, or the MST module 1426 may be included in one integrated chip (IC) or one IC package.

The RF module 1427 may communicate, for example, a communication signal (e.g., an RF signal). Though not shown, the RF module 1427 may include, for example, a transceiver, a power amplifier module (PAM), a frequency filter, or a low noise amplifier (LNA), or an antenna, and the like. According to another embodiment, at least one of the cellular module 1421, the Wi-Fi module 1422, the BT module 1423, the GNSS module 1424, the NFC module 1425, or the MST module 1426 may communicate an RF signal through a separate RF module.

The SIM 1429 may include, for example, a card which includes a SIM and/or an embedded SIM. The SIM 1429 may include unique identification information (e.g., an integrated circuit card identifier (ICCID)) or subscriber information (e.g., an IMSI).

The memory 1430 (e.g., a memory 1330 of FIG. 13) may include, for example, an embedded (internal) memory 1432 or an external memory 1434. The embedded memory 1432 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 1434 may include a flash drive, for example, a compact flash (CF), a secure digital (SD), a micro-SD, a mini-SD, an extreme digital (xD), a multimedia card (MMC), or a memory stick, and the like. The external memory 1434 may operatively and/or physically connect with the electronic device 1401 through various interfaces.

The secure module 1436 may be a module which has a relatively higher secure level than the memory 1430 and may be a circuit which stores secure data and guarantees a protected execution environment. The secure module 1436 may be implemented with a separate circuit and may include a separate processor. The secure module 1436 may include, for example, an embedded secure element (eSE) which is present in a removable smart chip or a removable SD card or is embedded in a fixed chip of the electronic device 1401. Also, the secure module 1436 may be driven by an OS different from the OS of the electronic device 1401. For example, the secure module 1436 may operate based on a java card open platform (JCOP) OS.

The sensor module 1440 may measure, for example, a physical quantity or may detect an operation state of the electronic device 1401, and may convert the measured or detected information to an electric signal. The sensor module 1440 may include at least one of, for example, a gesture sensor 1440A, a gyro sensor 1440B, a barometric (atmospheric) pressure sensor 1440C, a magnetic sensor 1440D, an acceleration sensor 1440E, a grip sensor 1440F, a proximity sensor 1440G, a color sensor 1440H (e.g., red, green, blue (RGB) sensor), a biometric sensor 1440I, a temperature/humidity sensor 1440J, an illumination sensor 1440K, or an ultraviolet (UV) sensor 1440M. Additionally or alternatively, the sensor module 1440 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 1440 may further include a control circuit for controlling at least one or more sensors included therein. In various embodiments, the electronic device 1401 may further include a processor configured to control the sensor module 1440, as part of the processor 1410 or to be independent of the processor 1410. While the processor 1410 is in a sleep state, the electronic device 1401 may control the sensor module 1440.

The input device 1450 may include, for example, a touch panel 1452, a (digital) pen sensor 1454, a key 1456, or an ultrasonic input unit 1458. The touch panel 1452 may use, for example, at least one of a capacitive type, a resistive type, an IR type, or an ultrasonic type. Also, the touch panel 1452 may include a control circuit. The touch panel 1452 may further include a tactile layer and may provide a tactile reaction to a user.

The (digital) pen sensor 1454 may be, for example, part of the touch panel 1452 or may include a separate sheet for recognition. The key 1456 may include, for example, a physical button, an optical key, or a keypad. The ultrasonic input unit 1458 may allow the electronic device 1401 to detect an ultrasonic wave generated by an input tool, through a microphone (e.g., a microphone 1488) and to verify data corresponding to the detected ultrasonic wave.

The display 1460 (e.g., a display 1360 of FIG. 13) may include a panel 1462, a hologram device 1464, or a projector 1466. The panel 1462 may include the same or similar configuration to the display 1360. The panel 1462 may be implemented to be, for example, flexible, transparent, or wearable. The panel 1462 and the touch panel 1452 may be integrated into one module. According to an embodiment, the panel 1462 may include a pressure (or a force sensor interchangeably used hereinafter) which may measure intensity of pressure on a touch of a user. The pressure sensor may be integrated with the touch panel 1452 or may be implemented with one or more sensors independent of the touch panel 1452. The hologram device 1464 may show a stereoscopic image in a space using interference of light. The projector 1466 may project light onto a screen to display an image. The screen may be positioned, for example, inside or outside the electronic device 1401. According to an embodiment, the display 1460 may further include a control circuit for controlling the panel 1462, the hologram device 1464, or the projector 1466.

The interface 1470 may include, for example, a high-definition multimedia interface (HDMI) 1472, a USB 1474, an optical interface 1476, or a D-subminiature 1478. The interface 1470 may be included in, for example, a communication interface 1370 shown in FIG. 13. Additionally or alternatively, the interface 1470 may include, for example, a mobile high definition link (MHL) interface, an SD card/MMC interface, or an infrared data association (IrDA) standard interface.

The audio module 1480 may interchangeably convert a sound into an electric signal. At least some of components of the audio module 1480 may be included in, for example, an input and output interface 1350 shown in FIG. 13. The audio module 1480 may process sound information input or output through, for example, a speaker 1482, a receiver 1484, an earphone 1486, or the microphone 1488, and the like.

The camera module 1491 may be a device which captures a still image and a moving image. According to an embodiment, the camera module 1491 may include one or more image sensors (not shown) (e.g., a front sensor or a rear sensor), a lens (not shown), an ISP (not shown), or a flash (not shown) (e.g., an LED or a xenon lamp).

The power management module 1495 may manage, for example, power of the electronic device 1401. According to an embodiment, though not shown, the power management module 1495 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 1496 and voltage, current, or temperature thereof while the battery 1496 is charged. The battery 1496 may include, for example, a rechargeable battery or a solar battery.

The indicator 1497 may display a specific state of the electronic device 1401 or part (e.g., the processor 1410) thereof, for example, a booting state, a message state, or a charging state, and the like. The motor 1498 may convert an electric signal into mechanical vibration and may generate vibration or a haptic effect, and the like. Though not shown, the electronic device 1401 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 15:
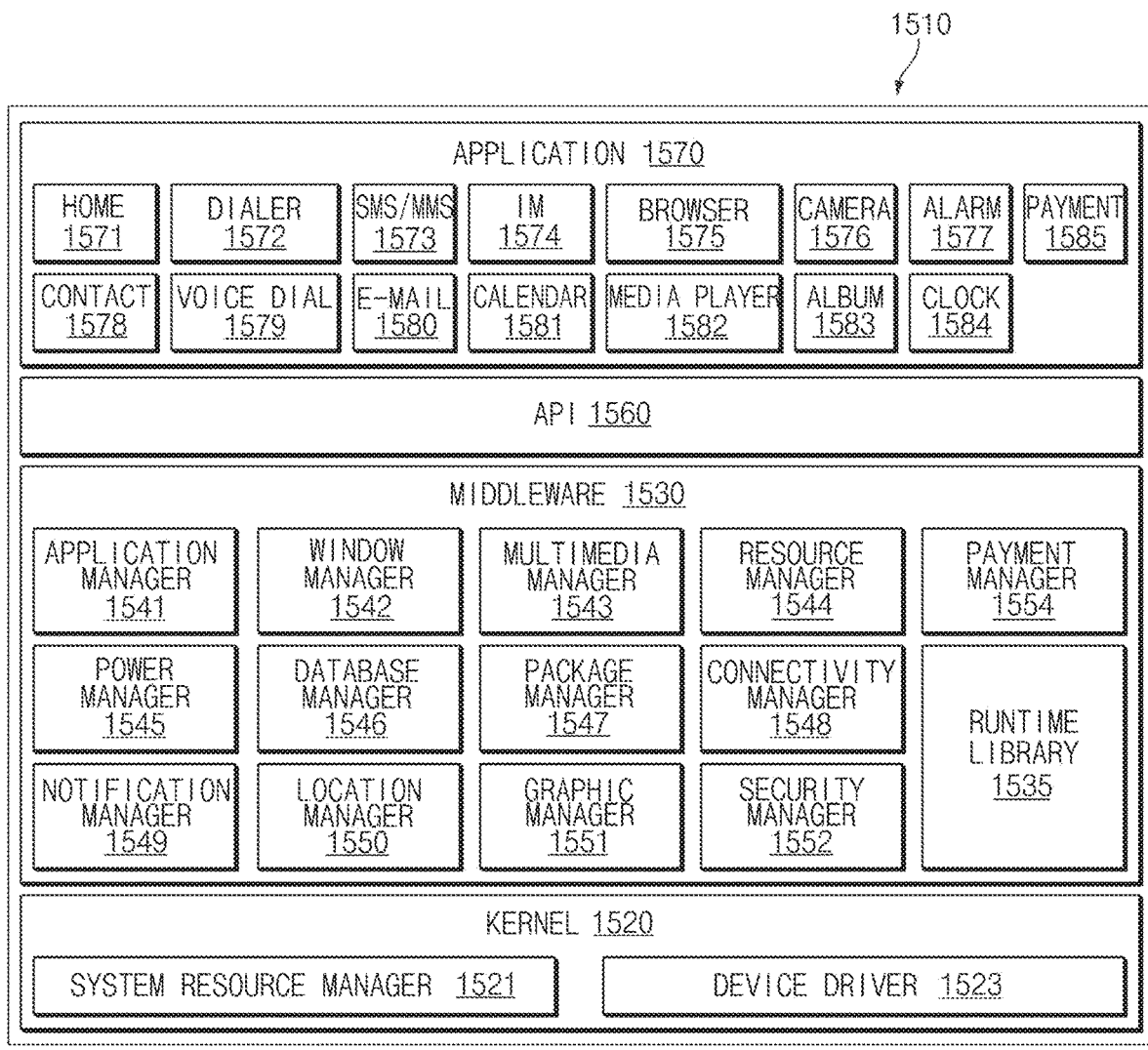
FIG. 15 is a block diagram illustrating a configuration of a program module according to various embodiments of the present disclosure.

FIG. 15 is a block diagram illustrating a configuration of a program module according to various embodiments of the present disclosure.

Referring to FIG. 15, according to an embodiment, a program module 1510 (e.g., a program 1340 of FIG. 13) may include an OS for controlling resources associated with an electronic device (e.g., an electronic device 1301 of FIG. 13) and/or various applications (e.g., at least one application program 1347 of FIG. 13) which are executed on the OS. The OS may be, for example, Android, iOS, Windows, Symbian, Tizen, or Bada, and the like.

The program module 1510 may include a kernel 1520, a middleware 1530, an API 1560, and/or at least one application 1570. At least part of the program module 1510 may be preloaded on the electronic device, or may be downloaded from an external electronic device (e.g., a first external electronic device 1302, a second external electronic device 1304, or a server 1306, and the like of FIG. 13).

The kernel 1520 (e.g., a kernel 1341 of FIG. 13) may include, for example, a system resource manager 1521 and/or a device driver 1523. The system resource manager 1521 may control, assign, or collect, and the like system resources. According to an embodiment, the system resource manager 1521 may include a process management unit, a memory management unit, or a file system management unit, and the like. The device driver 1523 may include, for example, a display driver, a camera driver, a BT driver, a shared memory driver, a USB driver, a keypad driver, a Wi-Fi driver, an audio driver, or an inter-process communication (IPC) driver.

The middleware 1530 (e.g., a middleware 1343 of FIG. 3) may provide, for example, functions the application 1570 needs in common, and may provide various functions to the application 1570 through the API 1560 such that the application 1570 efficiently uses limited system resources in the electronic device. According to an embodiment, the middleware 1530 (e.g., the middleware 1343) may include at least one of a runtime library 1535, an application manager 1541, a window manager 1542, a multimedia manager 1543, a resource manager 1544, a power manager 1545, a database manager 1546, a package manager 1547, a connectivity manager 1548, a notification manager 1549, a location manager 1550, a graphic manager 1551, a security manager 1552, or a payment manager 1554.

The runtime library 1535 may include, for example, a library module used by a compiler to add a new function through a programming language while the application 1570 is executed. The runtime library 1535 may perform a function about input and output management, memory management, or an arithmetic function.

The application manager 1541 may manage, for example, a life cycle of at least one of the at least one application 1570. The window manager 1542 may manage graphic user interface (GUI) resources used on a screen of the electronic device. The multimedia manager 1543 may ascertain a format necessary for reproducing various media files and may encode or decode a media file using a codec corresponding to the corresponding format. The resource manager 1544 may manage source codes of at least one of the at least one application 1570, and may manage resources of a memory or a storage space, and the like.

The power manager 1545 may act together with, for example, a basic input/output system (BIOS) and the like, may manage a battery or a power source, and may provide power information necessary for an operation of the electronic device. The database manager 1546 may generate, search, or change a database to be used in at least one of the at least one application 1570. The package manager 1547 may manage installation or update of an application distributed by a type of a package file.

The connectivity manager 1548 may manage, for example, wireless connection such as Wi-Fi connection or BT connection, and the like. The notification manager 1549 may display or notify events, such as an arrival message, an appointment, and proximity notification, by a method which is not disturbed to the user. The location manager 1550 may manage location information of the electronic device. The graphic manager 1551 may manage a graphic effect to be provided to the user or a UI related to the graphic effect. The security manager 1552 may provide all security functions necessary for system security or user authentication, and the like. According to an embodiment, when the electronic device (e.g., the electronic device 1301) has a phone function, the middleware 1530 may further include a telephony manager (not shown) for managing a voice or video communication function of the electronic device.

The middleware 1530 may include a middleware module which configures combinations of various functions of the above-described components. The middleware 1530 may provide a module which specializes according to kinds of OSs to provide a differentiated function. Also, the middleware 1530 may dynamically delete some of old components or may add new components.

The API 1560 (e.g., an API 1345 of FIG. 13) may be, for example, a set of API programming functions, and may be provided with different components according to OSs. For example, in case of Android or iOS, one API set may be provided according to platforms. In case of Tizen, two or more API sets may be provided according to platforms.

The application 1570 (e.g., an application program 1347 of FIG. 13) may include one or more of, for example, a home application 1571, a dialer application 1572, a short message service/multimedia message service (SMS/MMS) application 1573, an instant message (IM) application 1574, a browser application 1575, a camera application 1576, an alarm application 1577, a contact application 1578, a voice dial application 1579, an e-mail application 1580, a calendar application 1581, a media player application 1582, an album application 1583, a clock application 1584, a payment application 1585, a health care application (e.g., an application for measuring quantity of exercise or blood sugar, and the like), or an environment information application (e.g., an application for providing atmospheric pressure information, humidity information, or temperature information, and the like), and the like.

According to an embodiment, the application 1570 may include an application (hereinafter, for better understanding and ease of description, referred to as "information exchange application") for exchanging information between the electronic device (e.g., the electronic device 1301) and an external electronic device (e.g., the first external electronic device 1302 or the second external electronic device 1304). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 1302 or the second external electronic device 1304). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 1302 or the second external electronic device 1304) which communicates with the electronic device, an application which operates in the external electronic device, or a service (e.g., a call service or a message service) provided from the external electronic device.

According to an embodiment, the application 1570 may include an application (e.g., the health card application of a mobile medical device) which is preset according to attributes of the external electronic device (e.g., the first external electronic device 1302 or the second external electronic device 1304). According to an embodiment of the present disclosure, the application 1570 may include an application received from the external electronic device (e.g., the server 1306, the first external electronic device 1302, or the second external electronic device 1304). According to an embodiment of the present disclosure, the application 1570 may include a preloaded application or a third party application which may be downloaded from a server. Names of the components of the program module 1510 according to various embodiments of the present disclosure may differ according to kinds of OSs.

According to various embodiments, at least part of the program module 1510 may be implemented with software, firmware, hardware, or at least two or more combinations thereof. At least part of the program module 1510 may be implemented (e.g., executed) by, for example, a processor (e.g., a processor 1410 of FIG. 14). At least part of the program module 1510 may include, for example, a module, a program, a routine, sets of instructions, or a process, and the like for performing one or more functions.

According to various embodiments, a computer-readable storage media may include a program for executing a method of receiving a request associated with payment corresponding to an external device from the external device using a communication module operatively connected with an electronic device, determining whether it is possible for the electronic device to perform payment in response to the request, receiving transaction information associated with the payment from the external device based on the at least determination, and performing the payment based on the at least transaction information.

The terminology "module" used herein may mean, for example, a unit including one of hardware, software, and firmware or two or more combinations thereof. The terminology "module" may be interchangeably used with, for example, terminologies "unit," "logic," "logical block,"

"component," or "circuit," and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments, at least part of a device (e.g., modules or the functions) or a method (e.g., operations) may be implemented with, for example, instructions stored in computer-readable storage media which have a program module. When the instructions are executed by a processor (e.g., a processor 1320 of FIG. 13), one or more processors may perform functions corresponding to the instructions. The computer-readable storage media may be, for example, a memory 1330 of FIG. 13.

The computer-readable storage media may include a hard disc, a floppy disk, magnetic media (e.g., a magnetic tape), optical media (e.g., a compact disc-ROM (CD-ROM) and a DVD), magneto-optical media (e.g., a floptical disk), a hardware device (e.g., a ROM, a RAM, or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Modules or program modules according to various embodiments may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

According to various embodiments, the electronic device may reduce inconvenience in which it should store payment information in a plurality of electronic devices to pay using the plurality of electronic devices by performing payment using one electronic device which stores payment information if the payment is requested from various external devices.

According to various embodiments, the electronic device may determine capability of hardware of the electronic device and/or capability of software of the electronic device. For example, the electronic device may verify whether it is possible to perform payment using at least one of a biometric sensor, a secure element, or an input device included in the electronic device. For another example, the electronic device may verify whether it is possible to perform payment based on bank information or card information stored in the electronic device. The electronic device may send a response that it is possible to process the payment based on the verification to the external device. The electronic device may perform the payment based on contents associated with transaction information received from the external device. According to an embodiment, the transaction information may include at least one of a payment product, a payment authentication device, device identification information (e.g., a MAC address), or identification information of a seller. The transaction information may include at least one of address information associated with the payment, shopping cart information, a wish list, product information, content information, identification information of a seller, or an order number.

According to various embodiments, the electronic device may strengthen security by storing payment information in one electronic device. For example, if the payment information is card information, the electronic device may reduce a hacking path of the card information and may strengthen security for the card information by storing the card information in only the one electronic device.

According to various embodiments, the electronic device may provide a UI of simplifying a process required for payment by providing transaction information received from the external device and a payment screen displayed on the external device.

According to various embodiments, the electronic device may provide a screen corresponding to a screen displayed on the external device to the user based on transaction information received from the external device. For example, the electronic device may seamlessly provide information about an item (e.g., a product or a service) the user wants to purchase via the external device to the user. To seamlessly provide product information and service information, the external device may receive information corresponding to a product or a service.

The above-mentioned item may not be limited to a product and may include various items, such as a service, a product, P2P remittance, P2P payment, a P2P loan, bank transaction, account transaction, or crowdfunding, necessary for payment. For example, the electronic device may perform processing associated with various electronic payment supported by FinTech.

In addition, according to various embodiments, the electronic device may provide various effects directly or indirectly ascertained through the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device using a payment handoff from an external device, the electronic device comprising:
 a communication circuit configured to communicate with the external device;
 a memory configured to store at least one card information; and
 at least one processor, electrically connected with the communication circuit and the memory, configured to:
  receive, from the external device, a request to verify whether it is viable for the electronic device to make a payment,
  determine whether it is viable for the electronic device to make the payment using the at least one card information stored in the memory, based on capability of at least one hardware component of the electronic device and at least one software component stored in the memory for performing the payment, wherein the at least one hardware component includes at least one of a biometric sensor, a secure element, or a input device, and wherein the at least one software component includes at least one of the at least one card information, bank information, balance information, or a payment application, based on a determination that it is viable for the electronic device to make the payment using the at least one card information stored in the memory, send, to the external device, a response to the request including an indication that it is viable for the electronic device to make the payment, after the response to the request including the indication that it is viable for the electronic device to make the payment is sent, receive, from the external device, a message including transaction information being handed off from the external device for use by the electronic device to make the payment with security based on authentication information received by the electronic device from a user of the electronic device and encryption by the electronic device of the at least one card information stored in the memory instead of the payment being made by the external device, receive the authentication information from the user of the electronic device, and make the payment based on the authentication information received from the user of the electronic device, the at least one card information stored in the memory, and the transaction information received in response to the message, the making of the payment comprising:
encrypting the at least one card information stored in the memory, and
sending the encrypted at least one card information to a payment server.

2. The electronic device of claim 1, wherein the at least one processor is further configured to:
receive the transaction information, including at least one of a uniform resource indicator (URI), identification information of a seller, or an order number associated with the payment, via the communication circuit from the external device.

3. The electronic device of claim 2, further comprising:
a display,
wherein the at least one processor is further configured to:
present a screen for performing the payment on the display based on the URI.

4. The electronic device of claim 1, wherein the at least one processor is further configured to:
send a result for notifying the external device of completion of the payment via the communication circuit to the external device, if the payment is completed.

5. The electronic device of claim 1,
wherein the external device comprises a television (TV) or a set-top box of the TV, and
wherein the at least one processor is further configured to:
receive information associated with a channel on the TV from the TV or the set-top box, and
obtain information, about a product which is being broadcasted on the channel, based on the information associated with the channel.

6. The electronic device of claim 1, wherein the at least one processor is further configured to:
receive first transaction information, about a first payment, via the communication circuit,
receive second transaction information, about a second payment, via the communication circuit, and
simultaneously make the first payment and the second payment using the first transaction information and the second transaction information.

7. The electronic device of claim 1, wherein the electronic device has a same user account as a user account of the external device or has an account included in a group associated with the user account of the external device.

8. The electronic device of claim 1, wherein the at least one processor is further configured to:
make the payment for part of a money amount included in the transaction information.

9. The electronic device of claim 1, wherein the at least one processor is further configured to:
obtain biometric information of the user of the electronic device as the authentication information of the user of the electronic device, and
send the biometric information to the external device to send the biometric information to a fast identity online (FIDO) server via the external device.

10. A non-transitory computer-readable recording medium having instructions stored thereon, the instructions configured to, when executed by at least one processor of an electronic device using a payment handoff from an external device, cause the electronic device to:
receive, from the external device, a request to verify whether it is viable for the electronic device to make a payment;
determine whether it is viable for the electronic device to make the payment using at least one card information stored in a memory of the electronic device, based on capability of at least one hardware component of the electronic device and at least one software component stored in the memory for performing the payment, wherein the at least one hardware component includes at least one of a biometric sensor, a secure element, or a input device, and wherein the at least one software component includes at least one of the at least one card information, bank information, balance information, or a payment application;
based on a determination that it is viable for the electronic device to make the payment using the at least one card information stored in the memory of the electronic device, send a response to the request to the external device, the response to the request including an indication that it is viable for the electronic device to make the payment;
after the response to the request including the indication that the electronic device is configured to make the payment is sent, receive, from the external device, a message including transaction information being handed off from the external device for use by the electronic device to make the payment with security based on authentication information received by the electronic device from a user of the electronic device and encryption by the electronic device of the at least one card information stored in the memory instead of the payment being made by the external device;
receive the authentication information from the user of the electronic device; and
make the payment based on the authentication information received from the user of the electronic device, the at least one card information stored in the memory, and the transaction information received in response to the message, the making of the payment comprising:
encrypting the at least one card information stored in the memory, and
sending the encrypted at least one card information to a payment server.

11. A non-transitory computer-readable recording medium having instructions stored thereon, the instructions configured to, when executed by at least one processor of an external device using a payment handoff to an electronic device, cause the external device to:
- send, to the electronic device, a request to verify whether it is viable for the electronic device to make a payment;
- receive, from the electronic device, a response to the request including an indication whether it is viable for the electronic device to make the payment;
- determine whether the indication included in the response to the request indicates that it is viable for the electronic device to make the payment, based on capability of at least one hardware component of the electronic device and at least one software component stored in a memory of the electronic device for performing the payment, wherein the at least one hardware component includes at least one of a biometric sensor, a secure element, or a input device, and wherein the at least one software component includes at least one of the at least one card information, bank information, balance information, or a payment application;
- in response to a determination that the indication included in the response to the request indicates that it is viable for the electronic device to make the payment, send, to the electronic device, a message including transaction information being handed off from the external device for use by the electronic device to make the payment with security based on authentication information received by the electronic device from a user of the electronic device and encryption by the electronic device of the at least one card information stored in a memory of the electronic device instead of the payment being made by the external device; and
- receive, from the electronic device, a result of the payment made by the electronic device using the transaction information.

12. The non-transitory computer-readable recording medium of claim 11, wherein the sending of the message comprises:
- outputting a user interface (UI), for handoff of the payment, in response to receiving the response to the request,
- receiving a user input on the UI, and
- sending the message to the electronic device in response to the user input.

13. The non-transitory computer-readable recording medium of claim 11, wherein the transaction information comprises at least one of a uniform resource indicator (URI), identification information of a seller, or an order number associated with the payment.

14. The non-transitory computer-readable recording medium of claim 11, wherein the instructions are further configured to, when executed by the at least one processor of the external device, cause the external device to:
- receive the transaction information from a server which provides an electronic commerce.

* * * * *